(12) United States Patent
Neff

(10) Patent No.: US 10,056,937 B1
(45) Date of Patent: Aug. 21, 2018

(54) GENERATOR OF COMMUNICATIONS BINARY CODE SHIFT KEY (CSK) CODES IN MEMORY USABLE FOR TIME-SYNCHRONOUS RETRIEVALS BY SIGNAL PROCESSING SYSTEMS TO EXTRACT 1 OF 16 ORTHOGONAL CSK SYMBOL CODES PER CSK CODE TO TRANSPORT 4-BITS OF DATA OVER WIRELESS COMMUNICATIONS SYSTEMS

(71) Applicant: Rupert Theodore Neff, Goose Creek, SC (US)

(72) Inventor: Rupert Theodore Neff, Goose Creek, SC (US)

( * ) Notice: Subject to any disclaimer, the term of this patent is extended or adjusted under 35 U.S.C. 154(b) by 0 days.

(21) Appl. No.: 15/717,848

(22) Filed: Sep. 27, 2017

(51) Int. Cl.
   *H04B 1/00* (2006.01)
   *H04B 1/7073* (2011.01)
   *G06F 7/58* (2006.01)
(52) U.S. Cl.
   CPC ......... *H04B 1/70735* (2013.01); *G06F 7/588* (2013.01); *H04B 2201/7073* (2013.01)
(58) Field of Classification Search
   CPC ........ H04B 1/70375; H04B 2201/7073; G06F 7/588
   See application file for complete search history.

(56) References Cited

U.S. PATENT DOCUMENTS

| | | | | |
|---|---|---|---|---|
| 7,411,993 B2 * | 8/2008 | Sunaga | ................... | H04J 13/10 375/130 |
| 2014/0056333 A1 * | 2/2014 | Neff | ..................... | H04B 1/7073 375/149 |

* cited by examiner

*Primary Examiner* — Dac Ha

(57) ABSTRACT

Presented is a generator of binary code shift key (CSK) codes pre-saved to memory usable for time synchronous CSK code retrievals with extraction capability for 1 of 16 orthogonal CSK symbol codes under control of a supported communications system. The CSK code generator pre-defines a 1332 root prime number sequence containing 6 unique prime numbers including 221-7s, 222-11s, 221-13s, 223-17s, 222-19s, and 223-23s that receive multiple index shuffles of 1332 indexes. Pairs of 1332 shuffled indexes of prime sequences are then merged and formatted into 100 tier0 100 hex character format codes. Two levels of XORs of hex character format code pairs generate CSK codes that are collected into 10000 code files that are saved to memory. Time-synchronous CSK code retrieval is followed by 1 of 16 CSK orthogonal symbol codes extraction based on new half-byte data values under flow control of the supported communications system.

1 Claim, 13 Drawing Sheets

OVERVIEW OF A GENERATOR OF BINARY CODE SHIFT KEY (CSK) CODES IN MEMORY USABLE FOR TIME-SYNCHRONOUS RETRIEVALS TO EXTRACT 1 OF 16 ORTHOGONAL CSK SYMBOL CODES TO SUPPORT WIRELESS COMMUNICATIONS SYSTEMS

FIG. 1 OVERVIEW OF A GENERATOR OF BINARY CODE SHIFT KEY (CSK) CODES IN MEMORY USABLE FOR TIME-SYNCHRONOUS RETRIEVALS TO EXTRACT 1 OF 16 ORTHOGONAL CSK SYMBOL CODES TO SUPPORT WIRELESS COMMUNICATIONS SYSTEMS

SUPPORTED SIGNAL PROCESSING SYSTEM MODULATORS AND DEMODULATORS AND TIME-SYNCHRONOUS CSK SYMBOL CODE EXTRACTOR MEANS

PROCESSING TIERS DETAIL OF A GENERATOR OF BINARY CODE SHIFT KEY (CSK) CODES IN MEMORY USABLE FOR TIME-SYNCHRONOUS RETRIEVALS TO EXTRACT 1 OF 16 ORTHOGONAL CSK SYMBOL CODES TO SUPPORT WIRELESS COMMUNICATIONS SYSTEMS

FIG. 5 CSK CODES TIER0 AND CSK PULSE WIDTH DISTRIBUTIONS AND POWER SPECTRAL DENSITIES
| PULSE WIDTH | CSK DEDICATED CHIPS IN 400 | TIER0 DEDICATED CHIPS OUT OF 20000 |
|---|---|---|
| 1 | 18 | 0 |
| 2 | 20 | 0 |
| 3 | 21 | 0 |
| 4 | 16 | 0 |
| 5 | 50 | 0 |
| 6 | 24 | 0 |
| 7 | 63 | 1547 |
| 8 | 24 | 0 |
| 9 | 45 | 0 |
| 10 | 40 | 0 |
| 11 | 22 | 2442 |
| 12 | 24 | 0 |
| 13 | 13 | 2873 |
| 14 | 0 | 0 |
| 15 | 0 | 0 |
| 16 | 0 | 0 |
| 17 | 0 | 3791 |
| 18 | 0 | 0 |
| 19 | 0 | 4218 |
| 20 | 20 | 0 |
| 21 | 0 | 0 |
| 22 | 0 | 0 |
| 23 | 0 | 5129 |
Labels: 68, 69, 70
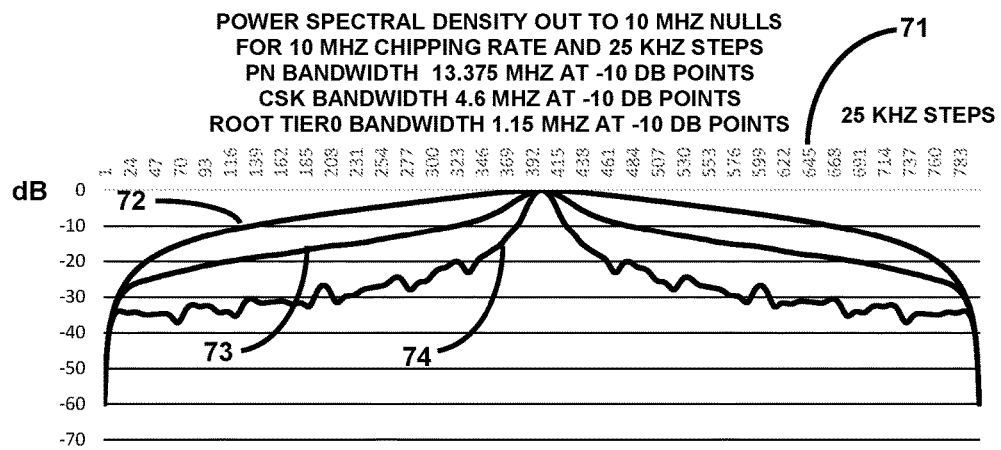
POWER SPECTRAL DENSITY OUT TO 10 MHZ NULLS
FOR 10 MHZ CHIPPING RATE AND 25 KHZ STEPS
PN BANDWIDTH 13.375 MHZ AT -10 DB POINTS
CSK BANDWIDTH 4.6 MHZ AT -10 DB POINTS
ROOT TIER0 BANDWIDTH 1.15 MHZ AT -10 DB POINTS
25 KHZ STEPS — 71
Labels: 72, 73, 74

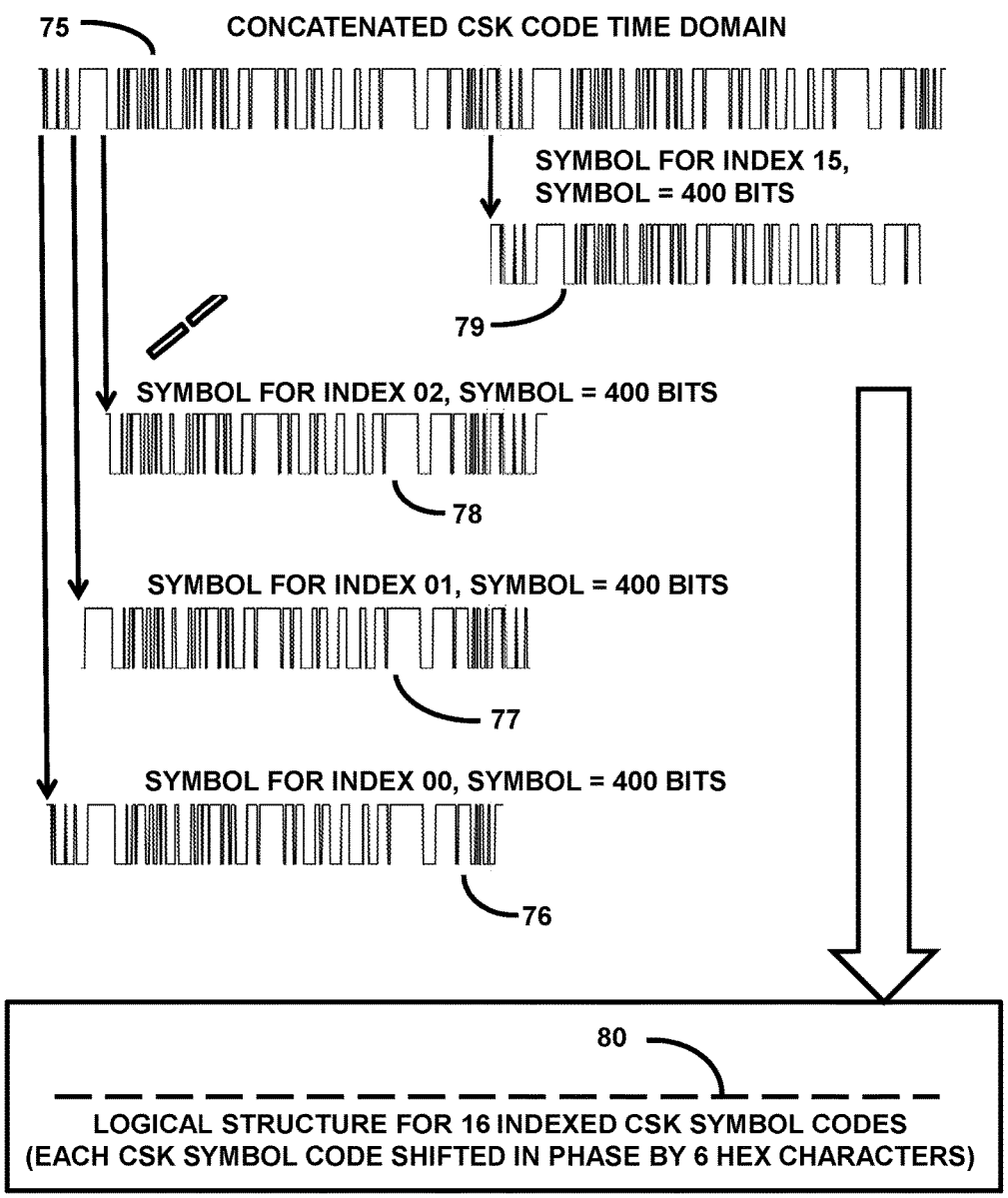
FIG. 6 A MEANS FOR EXTRACTION OF 16 ORTHOGONAL CSK SYMBOL CODES PROVIDED TO SUPPORTED SIGNAL PROCESSING SYSTEMS THAT SYNCHRONOUSLY RECEIVE ORIGINAL CSK CODES FROM MEMORY

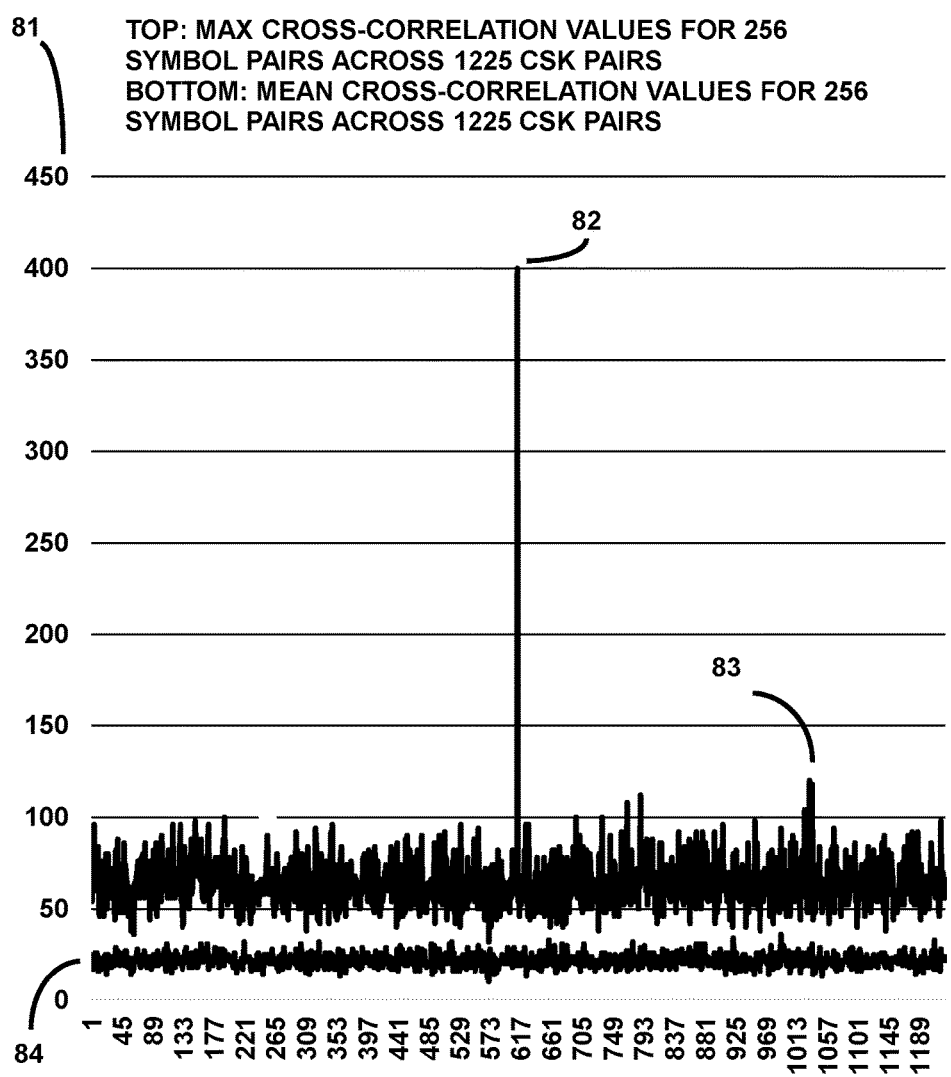

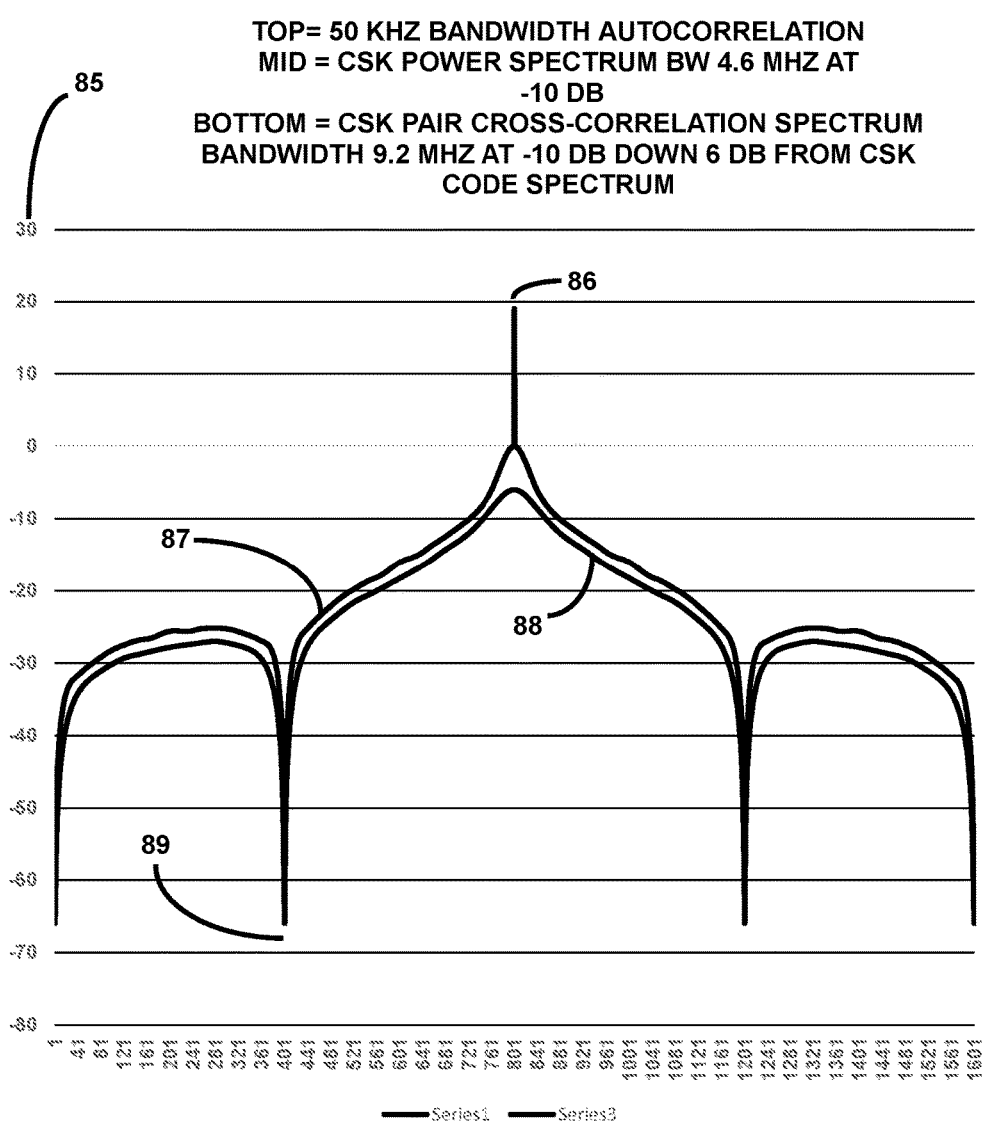

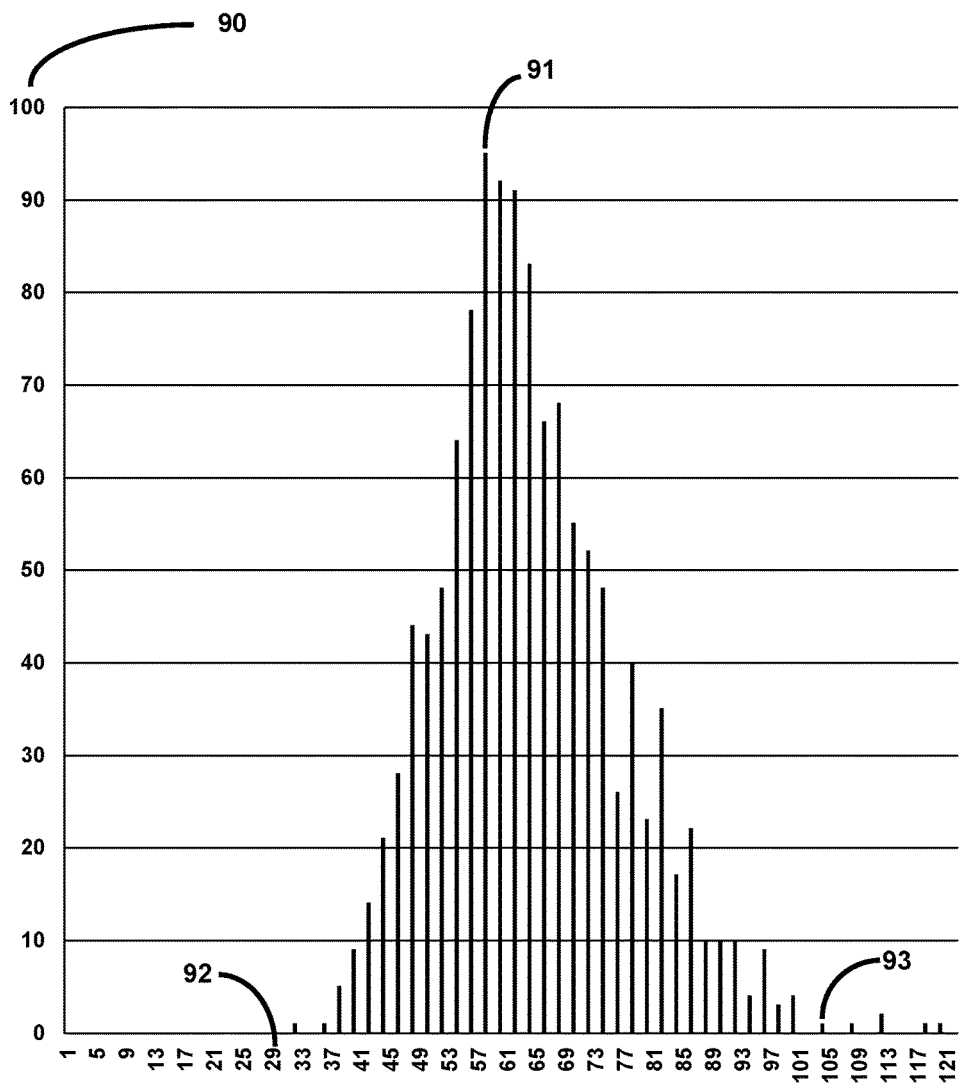

FIG. 10 SAMPLE OF CSK CODES FILE STORAGE STRUCTURE
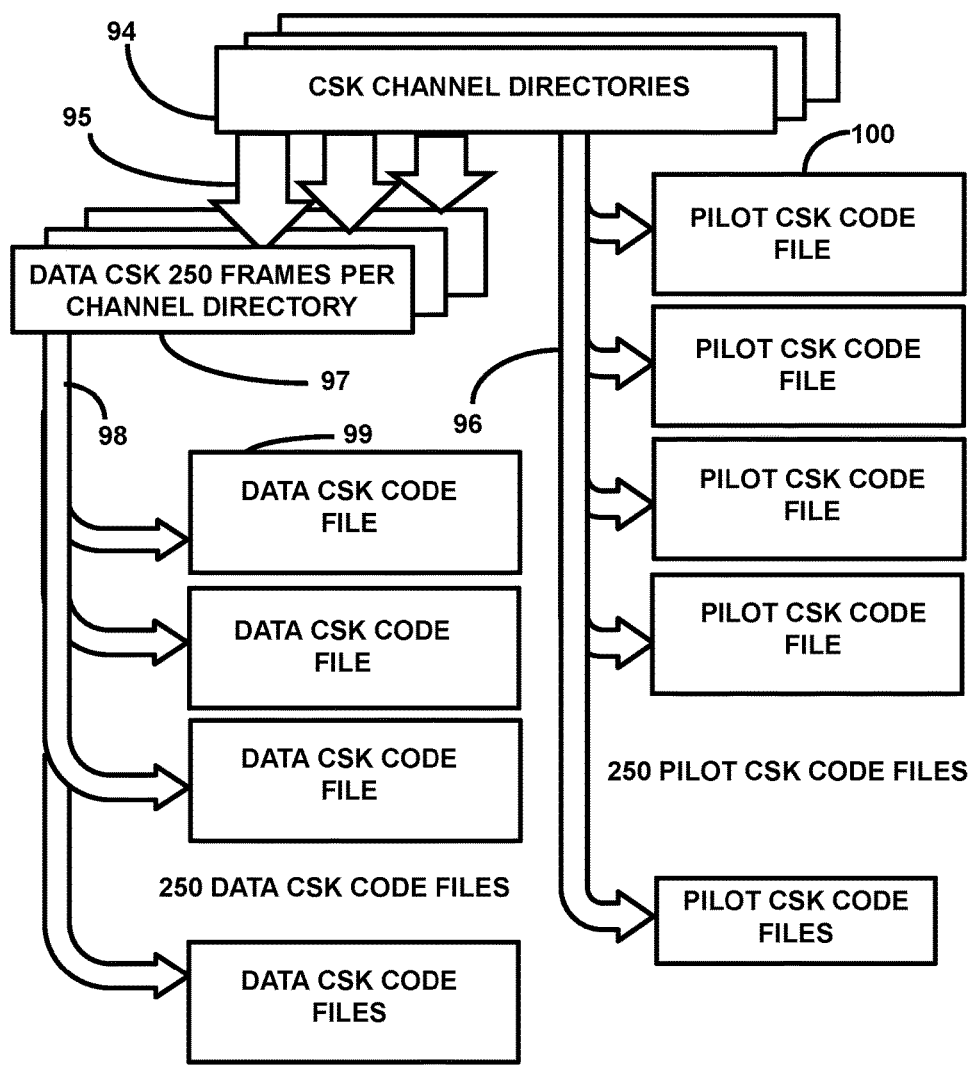

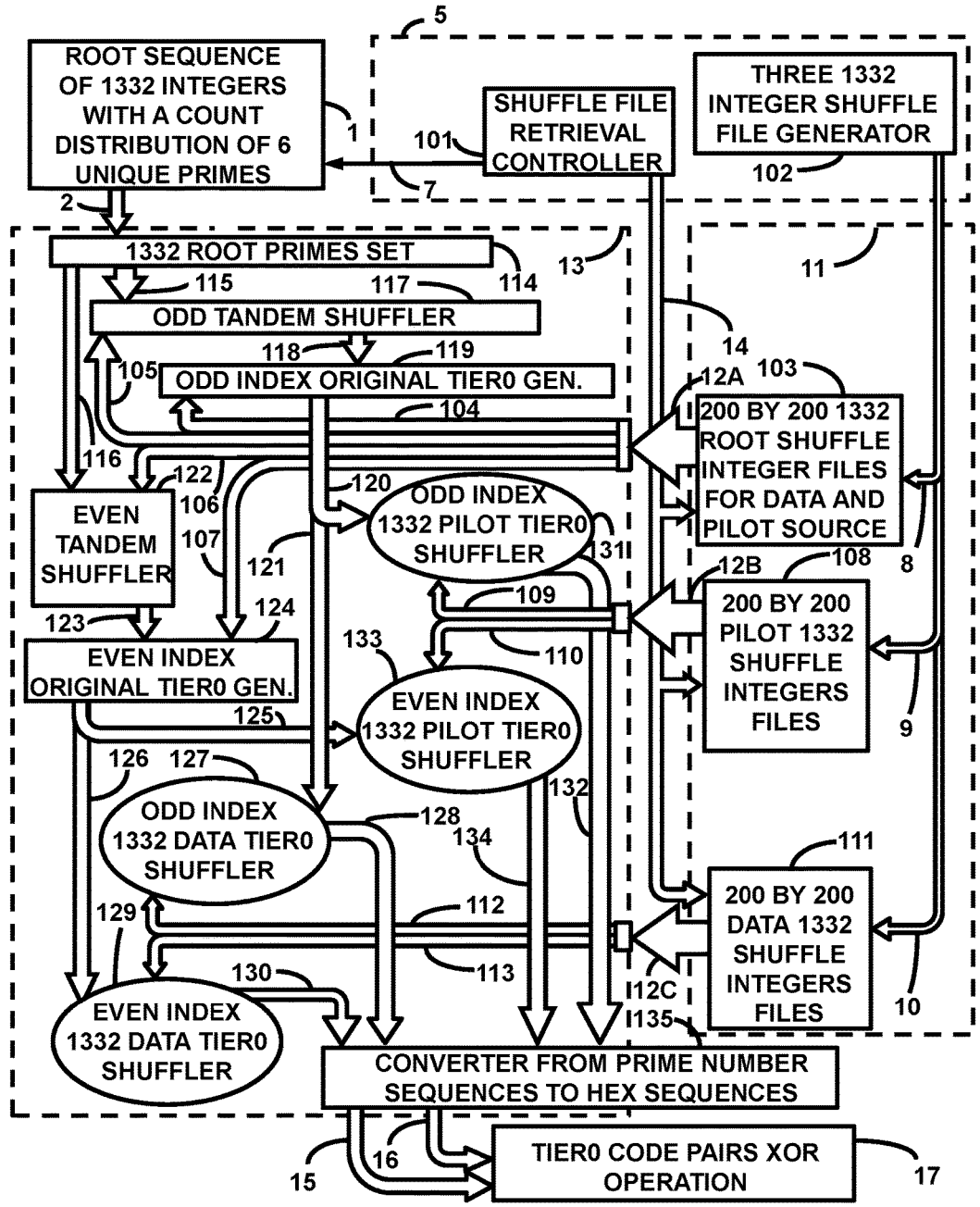
FIG. 11 FOCUS ON ALL 1332 SHUFFLE OPERATIONS

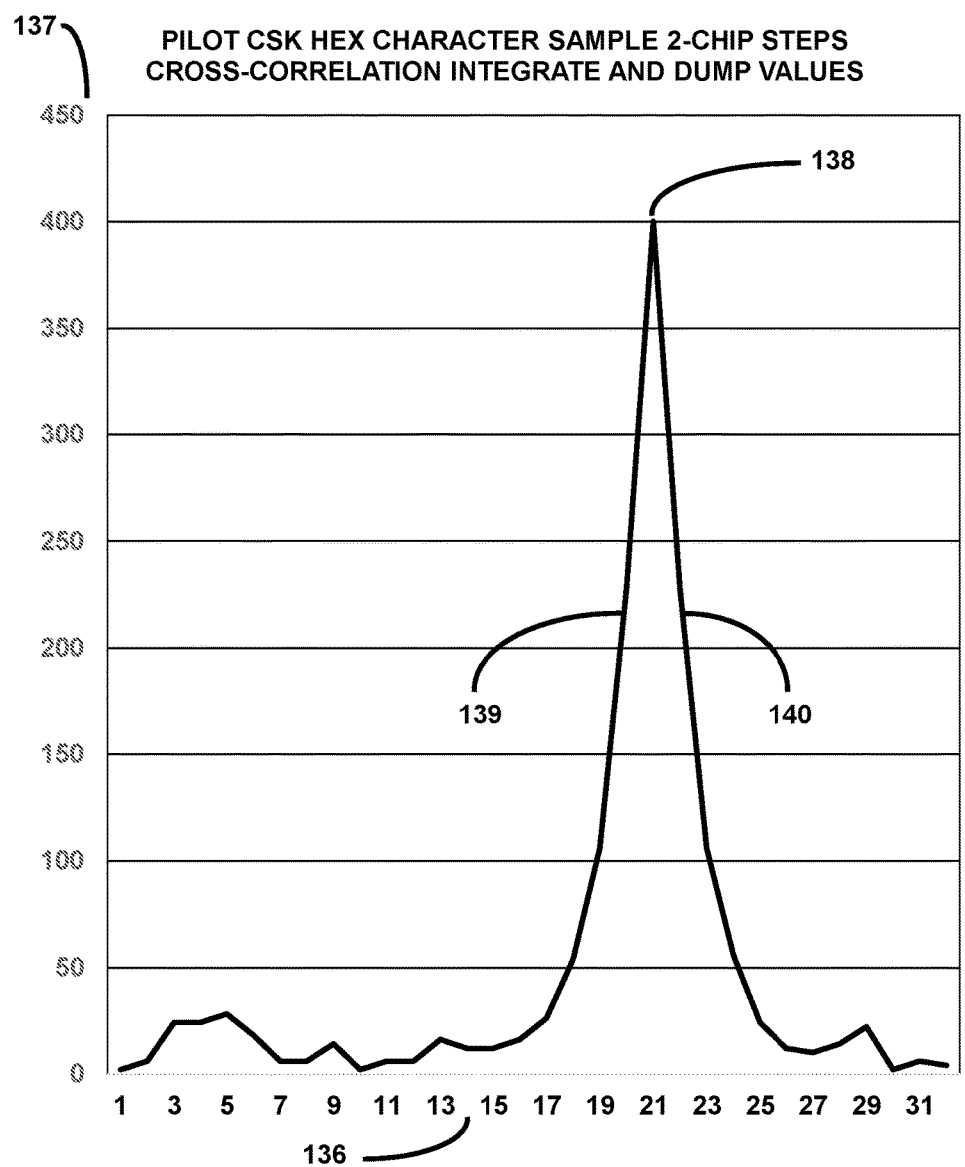

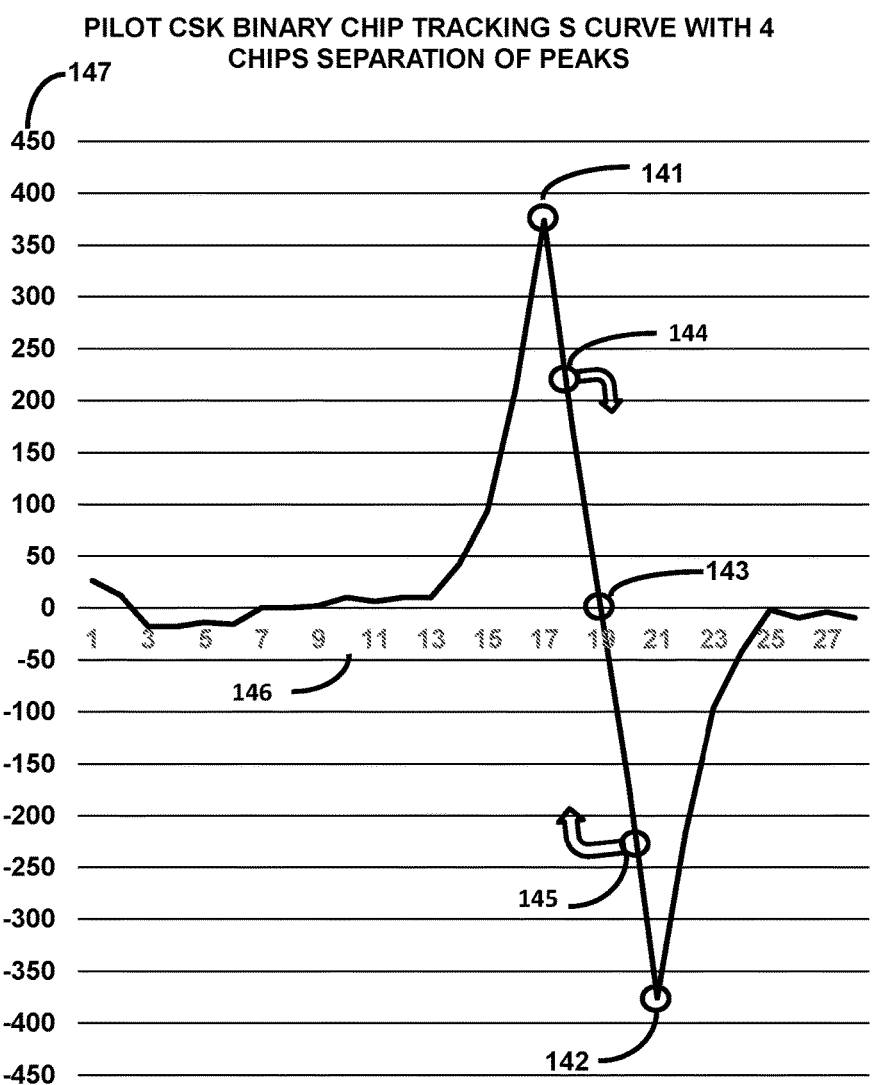

GENERATOR OF COMMUNICATIONS BINARY CODE SHIFT KEY (CSK) CODES IN MEMORY USABLE FOR TIME-SYNCHRONOUS RETRIEVALS BY SIGNAL PROCESSING SYSTEMS TO EXTRACT 1 OF 16 ORTHOGONAL CSK SYMBOL CODES PER CSK CODE TO TRANSPORT 4-BITS OF DATA OVER WIRELESS COMMUNICATIONS SYSTEMS

CROSS-REFERENCE TO RELATED APPLICATIONS

| Application Number | Filling Date | Pat. No. | Issue Date |
|---|---|---|---|
| 331,925 | Oct., 1994 | 5,488,631 | Jan., 1996 |
| 428,389 | Apr., 1995 | 5,596,516 | Jan., 1997 |
| 432,905 | May., 1995 | 5,724,383 | Mar., 1998 |
| 432,913 | May., 1995 | 5,761,239 | Jun., 1998 |
| 432,907 | May., 1995 | 5,790,591 | Aug., 1998 |
| 329,473 | Jun., 1999 | 6,091,760 | Jul., 2000 |
| 215,463 | Dec., 1998 | 6,445,714 | Sep., 2002 |
| 751,782 | Dec., 2000 | 6,567,017 | May., 2003 |
| 034,554 | Dec., 2001 | 6,667,708 | Dec., 2003 |
| 832,067 | Apr., 2001 | 7,386,026 | Jun., 2008 |
| 103,266 | Apr., 2005 | 7,411,993 | Aug., 2008 |
| 517,985 | Sep., 2006 | 7,930,623 | Apr., 2011 |
| 399,953 | Apr., 2006 | 8,102,900 | Jan., 2012 |
| 700,894 | Feb., 2007 | 7,949,773 | May., 2011 |
| 791,523 | Feb., 2001 | 7,930,623 | Apr., 2011 |
| 595,684 | Aug., 2012 | 9,071,341 | Jun., 2015 |
| 103.266 | Apr., 2005 | 9,411,993 | Aug., 2008 |

Current U.S. Class: 375/150, 200, 206, 142, 145, 146, 149, 208; 380/31, 34, 42

Current H04B, H04L. H04J. H04B, H04K International Class:

Field of Search: 375/200, 206, 208, 209, 210; 380/1, 9, 28, 31, 42, 200, 206

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

TECHNICAL FIELD AND INDUSTRIAL APPLICABILITY OF THE INVENTION

This invention relates to the field of binary code generators that generate communications binary code shift key (CSK) non-repeating codes that are one-time saved to memory. Each CSK code is usable by time synchronous CSK signal processing systems for extraction of 1 of 16 orthogonal CSK symbol codes that are uniquely transmitted wirelessly by supported communications systems to provide 4 data transport bits per CSK code. The invention provides the means for signal processing systems to logically extract 1 of 16 CSK orthogonal symbol codes from each synchronously retrieved CSK code with near-zero-time delays. Each transmitted or detected CSK symbol code is indexed uniquely to accommodate pointing to a unique CSK symbol code with a reference 4-bits of transport data and transmitting the selected CSK symbol code to support wireless communications systems. This embodiment includes the extraction means for the supported communications system to logically define 1 to 16 CSK symbol codes from each retrieved CSK code to time-synchronously control the flow of 4-bits of transport data using orthogonal CSK symbol codes in the transmit or receive processes. Each CSK symbol code is orthogonal to every other CSK symbol code extracted from all other CSK codes in the epoch of codes in memory, and is 400 bits long and defined by 100 hex characters. The CSK symbol extraction means is defined for instant detection of a synchronously received original CSK symbol code index 1 to 16 simultaneously by a receiver and supported signal processing system.

BACKGROUND OF THE INVENTION

A recent prior art random non-cyclical binary code generator of binary digital codes for one-time loading to memory, and for later synchronous retrieval by a supported signal processing system, is found in the patent application Ser. No. 13/595,684 filed Aug. 27, 2012 and prior publication data Neff US 2014/0056333 A1 of Feb. 27, 2014, followed by newly assigned patent number U.S. Pat. No. 9,071,341 published 30 Jun. 2015. In this prior art, a memory-based binary code source of random non-cyclical binary codes replaces the earlier prior art shift register based code generators referred to as pseudorandom noise (PN) binary code generators of today. The published patent U.S. Pat. No. 9,071,341 describes asynchronous random binary code generators that perform one-time loads of orthogonal non-repeating binary codes into two local memories usable by a supported signal processing system. This prior art code generator generates orthogonal codes for synchronous toggle between the two memories to generate a long epoch of non-repeating sets of random binary codes usable by a supported signal processing system. The random number generators in this prior art patent use unique random integer mappers to create near-ideal orthogonal random non-cyclical binary code sequences without shift registers. Each toggled memory contains a long epoch of generated orthogonal codes that can be used as a synchronous binary phase shifted key code family to overlay much slower transport data phase shift keyed data bits. This data overlay process deteriorates the original power spectral density profile requiring both data synchronization and code synchronization operations in the modulation and demodulation processes. However, unlike prior art binary code families of PN cyclical codes, the memory-based code that is optimized for long epochs of specific power spectral density profiles using a common 10 MHz chipping clock. This can reduce the code bandwidth with code power spectral density profiles and cross-correlation parameters consistent with longer epochs of non-repeating orthogonal binary codes. This prior art code family still has sidelobes outside the main lobe of energy but the binary codes are not repeated over long epochs of multiple orthogonal codes and do not contain long strings of 1s or 0s that are common to longer PN codes. These binary codes are only usable as phase shift key data overlay with lower rate data phase shift key modulation for transport of data. However, power spectral density sidelobes are still present causing correlation degradation in the demodulation processes. The power spectral density profile design versatility options are possible with these memory-based random binary codes but code shift key modulation (CSK) is not possible with these codes, thus limiting the spectral bandwidth efficiency for data transport.

The prior art binary modulation codes before the above described options have been shift register based codes in use since about year 1967. These PN codes are continuously generated in real time and are cyclical with short repeating cycles of binary sequences. A specific length shift register produces a single binary code that repeats at short intervals relative to practical wireless communications range delays of a few milliseconds. They are subject to multipath self-interference and experience degraded cross-correlation parameters when partial code lengths are used in PN families of binary codes. The native length shift register codes are extended by overlaying supplemental codes to enable use of multiple code length epochs resulting in further degradation of the cross-correlation parameters present with code-on-code modulations. This code-on-code phase-shifting for code extension plus addition transport data bit phase shifting for data demodulation further degrades the cross-correlation parameters of the transmitted PN codes.

A common prior art PN binary code is generated with a continuously running shift register that repeats code sequences with significant power spectrum side-lobes relative to the sin x/x main lobe. Direct sequence spread spectrum (DSSS) phase shift key (PSK) modulation is commonly used where longer data bits are phase modulated onto the higher chipping rate PN code sequences. The result is a requirement for extreme transmission bandwidth clearance out to 8× chipping rate to eliminate self-interference between local transmit and receive waveforms. The transmit spectrum bandwidths of these PN codes are much greater than the data bit rate bandwidth that reduces the information transport spectrum efficiency.

A prior art local receiver shift register code generator produces a local PN binary code replica of the cyclical transmitted binary code. This local replica is precisely delayed from the local transmit time of day consistent with communications range delays. Controlled delayed versions of the local synchronized PN code bi-phase modulation patterns are produced from a plethora of delay mechanisms detecting autocorrelation peaks, followed by acquiring and tracking of received PN binary codes. An example of this prior art is found in Sunaga et al. August 2008 U.S. Pat. No. 7,411,993 describing variations in the Gold code PN shift register code generation patterns created from multiple memory-based short PN sequences. The receiver local code autocorrelation process collapses or de-spreads the spectrum bandwidth consistent with the local code length and matching pattern cross-correlation parameters. Much lower data rates are used to phase modulate across many PN binary code lengths to form a second-tier data bit modulation rate much lower than the PN code chipping rate. The binary data phase modulation overlays the PN binary chipping modulation and is separately synchronized and detected. Data bits are non-predictable requiring complex stochastic detection methods to extract data bit synchronization. The signal processing system data rate to PN code chipping rate ratio is small in these cases, and spectrum inefficiency results. Examples of bandwidths and throughputs even with advanced optimum frequency division multiplexing (OFDM) waveforms for WIFI 802.11n produce only short range 100 Mbps throughput with a 40 MHz or greater bandwidth using the 5 GHz frequency band. Recent longer-range versions referred to as LTE-U employ time division, amplitude modulation, frequency division, and PN limited digital orthogonal shift-register based codes. These applications are for close range user routers in private homes and offices. The next generation WIFI 802.11ac signal processing system used in very short 50 ft. range applications estimates 1 Gbps throughput and requires 80 MHz or greater bandwidth in the 5 GHz or greater frequency band. The recently approved LTE-U version also has been approved for use in the 5 GHz band and employs multiple in multiple out (MIMO) in the 4×4 mode concurrent operations level. The expected 20 MHz bandwidth employment delivers throughputs of 5 Mbps to 15 Mbps on the average, and up to 300 Mbps in good conditions. When employing all possible modulation modes of time division, amplitude modulation, frequency division, and PN limited digital orthogonal shift-register based codes the throughput can be 1 Gbps requiring an LTE-U bandwidth of 100 MHz or greater in the 5 GHz or higher band.

PN binary codes have a repeat length that constrains the unique autocorrelation bit count length to a fixed value usable in the receiver de-spreading processes. This repeating cycle bit length is a basic characteristic of prior art shift register based binary codes common to XOR feedback shift registers used in the code generation process. An N-length shift register is the source of a prior art PN binary code order N. This shift register of length N creates a limited code binary bit length of a unique bi-phase modulation chip pattern defined by the expression: $L=(2^N)-1$, where L is the length of the repeating binary bit pattern from a binary shift register. This creates a cyclical repeating code that has a redundancy that must be resolved with code or data overlay processes to extract the data or ranging information. A longer shift register code emulation is required to resolve this short code redundant repeating cycle but is not feasible because of resulting long strings of "1 s" and "0s" that deteriorate all correlation parameters. A method commonly used is the overlay of much lower rate binary codes to emulate a non-repeating code. The result of this is the deterioration of correlation parameters and low data spectrum transport efficiency.

Prior art signal processing systems also use complex pulse shaping options and frequency division multiplexing techniques such as optimum frequency division multiplexing (OFDM) that are constrained to the natural PN code transmit bandwidths. Overlay of other codes and complex carrier-code integration designs such as OFDM increase the cost and increase the sensitivity to relative Doppler parameters causing Doppler based self-interference for vehicles or satellites with relative velocities above 100 mph.

The present PN-based wireless network throughput projection transitions extend through the 3G, 4G, and 5G standards employing only PN OFDM-based code modulation options using shift register based binary code sources. These PN options dictate a greater and greater transmission spectrum bandwidth to meet throughput requirements. This expansion extends to higher GHz bands with greater and greater bandwidth transmissions to meet 1 Gbps and greater network wireless throughputs.

In view of the technology limitations in the prior art PN-code based wireless systems, binary shift-register based code generators, and OFDM based waveforms, it would be advantageous to have a pre-saved memory based source of more ideal non-repeating random non-cyclical orthogonal binary CSK codes created by a one-time generator load process that can generate bandwidth optimized CSK codes capable of 4-bit CSK symbol data transport. This would be possible through extraction of 16 orthogonal CSK symbol codes per CSK code. Also, it would be advantageous if the number of unique, non-repeating, and orthogonal CSK codes is unlimited with the only limits the memory size limits. This would provide unlimited sets of orthogonal non-repeating CSK codes as the sources of 4-bit CSK code symbols for data transport. This would eliminate data overlay requirements and eliminate the inherent sidelobes present with PN based binary codes. It would be advantageous to have memory-based CSK codes without sidelobes that can be used to extract 16 orthogonal CSK symbol codes with the same code length and bandwidth that are uniquely detected by using each half-byte as the unique index of the CSK symbol code transmitted. It would also be advantageous to have unlimited numbers of orthogonal CSK binary codes with design selectable bandwidths of 4 MHz to 8 MHz with a fixed 10 MHz chipping rate. These unique CSK symbol codes could employ quadrature phase shift keying allowing the transport of 8-bit bytes using one frequency with two-symbol-code quadrature phase modulators. The advantages of local memory based collections of millions to billions of orthogonal CSK codes with 4-bit symbol code extraction capability allows the local modulator to use unlimited numbers of orthogonal CSK codes as a source of all orthogonal CSK symbol codes that are instantly extractable from each retrieved CSK code in memory usable across 1 or more seconds of orthogonal CSK codes in memory. The receive detection process would be deterministic instead of stochastic where the transmitted code identification is detected from one of 16 known locally extractable symbol codes from the synchronously retrieved CSK code. New technology including the graphene chip technology can be applied to these parallel processes.

It would further be advantageous to have controlled natural bandwidths and controlled power spectral density profiles common to high-count orthogonal CSK symbol codes without spectral sidelobes using a single preferred chipping rate of 10 MHz fitting all applications in this invention.

BRIEF SUMMARY OF THE INVENTION

The invention provides the generation of binary code shift key (CSK) codes and pre-saves epochs of code shift key (CSK) binary codes pre-saved to memory. Each of these CSK codes are designed with 16 orthogonal CSK symbol codes that can be extracted and transmitted and detected to support 4 transport data bits per CSK symbol code. The transmission timeslot is 40-microseconds in length and under synchronous control of a supported signal processing system. The invention CSK code files are structured for efficient file loads and file retrieval from memory with 1-second or greater epochs of CSK orthogonal code sets for 20 independent code channels of data. Local CSK code memory includes CSK data codes and CSK pilot codes, where the pilot codes are used to acquire and maintain time synchronization among client and star network nodes in a multiple in multiple out (MIMO) data transport environment. The local memory provides instant CSK code access consistent with transmit and receive time of day using a 1-second or more epoch of orthogonal CSK codes in memory. The CSK code generation process is a one-time activity that accommodates pre-loading of long epochs of large numbers of CSK orthogonal codes into a local memory. The pilot CSK code epoch is also 1 second or more, with the same code capacity as the data CSK codes allowing a common time synchronization across all network nodes. All CSK codes from memory accommodate the instant extraction of 16 unique CSK symbol codes with the invention including the means of extraction that is usable by the supported signal processing system. All CSK codes and CSK symbol codes are 400 bits in length and are orthogonal to all other CSK codes and CSK symbol codes. All binary codes in this invention are designed for a 10 MHz chipping clock. The multi-code epoch length is limited only by memory. The epoch practical length is determined by the network path delay where path delay is less than the epoch length for the maximum network path length. These CSK codes are generated from a single root source binary prime number distribution sequence with tailorable unique prime-number count distributions. This embodiment predefines a single root source binary sequence of prime numbers with only 6 unique prime numbers contained in each sequence of 1332 prime numbers that define 100 half-codes. All original 1332 half-code sets receive multiple prime-number sequence index shuffles. Each prime number represents a binary pulse width of 1s or 0s when two 1332 shuffled prime number sequences are allocated to odd or even index half-codes. When shuffled half-codes are merged into a single 2664 prime number sequence, the sequence defines a shuffled tier0 binary code sequence containing 100 tier0 binary codes. A single root source set of 1332 prime numbers define the distribution of primes common to all tier0 half-codes that defines the power spectrum and correlation characteristics of all orthogonal tier0 binary codes. This single root source set of 1332 prime numbers is first index shuffled multiple times with large numbers of 1332 random integer sets that are pre-defined as 6 sets of 1332 random shuffle integers, where each 200 sets of 1332 random shuffle integers is defined by a random number source based on unique random number seeds. A shuffle process applies these sets of 1332 shuffled index integers to replace the original indices of a single root source set of 1332 indexed prime numbers to create unique sets of 1332 shuffled index prime number sequences. These shuffle processes establish unbiased sets of multiple orthogonal shuffled prime number sets where each shuffled 1332 random prime number sequence is labeled the odd index or the even index of a 2664 random prime number tier0 code sequence. Each set of 100 tier0 codes define a sequence of 40000 bits, and is parsed to 100 codes each of length 400 bits. Each set of 100 tier0 codes is defined by two merged odd-even sets of 1332 random prime number sequences. Each unique 100 tier0 code set is reformatted from prime number sequences into 100 hex characters per code sequences in preparation for tier0 code pair XOR operations that follow all shuffles. Two tiers of XOR operations are completed. The first-tier outputs from 50 pairs of tier0 codes define 50 tier1 random hex format codes. These are also paired into 25 pairs of tier1 codes that are again XORed to generate 25 CSK codes of this patent. The CSK codes can be either designated data CSK codes or pilot CSK codes. The sets of tier0 code generation processes are repeated until 10000 CSK codes are collected and saved to a CSK code file that defines 1 frame of CSK codes for a channel of transmissions. A frame is 4 milliseconds and a 1 second epoch of CSK codes include 250 frames of CSK codes for a given channel. This invention generates 20 channels of CSK codes for a given network configuration in memory. Each 10000 CSK codes are in hex character format that define 100 hex characters per line and stacks 10000 lines per file in memory for efficient synchronous retrieval by a supported signal processing system. Parallel byte by byte data is flow-controlled to define pairs of transport half bytes in a quadrature phase shift key modulation element where the signal processing system uses each 4-bits of data as an index to the applicable data CSK symbol code to be transmitted. Each pair of 50 CSK symbol codes from the 10000 CSK code file is selected in parallel within each 40-microsecond correlation time slot for transmission. All CSK codes and CSK symbol codes are 100 hex characters in length (400 bits in length) and have a binary pulse width power spectral density profile bandwidth of 4.575 MHz at the −10 DB points with a common 10 MHz chipping clock. The pilot CSK codes power spectral density profiles and epoch are equivalent to data CSK codes and are orthogonal to all other CSK codes. The pilot initial time-phase search operations use GPS-reference universal time as a stable source for phase stepping in the receive acquisition processes resulting in the tracking of receive time of day within 2 nanoseconds. This reference is then used to establish local universal time of day within 2 nanoseconds between all network clients and star nodes. The pilot CSK code orthogonality allows options for multiple acquisition to be processed for each 40-microsecond correlation slot in the acquisition processes. Either CSK codes or CSK symbol codes can be used as pilot acquisition reference codes. A pilot transmission from both receive and transmit side of a MIMO link accommodates precision universal time transfer between network clients and network star nodes resulting in the transfer of a common universal time reference with 1 or 2 nanoseconds universal time accuracies possible among large numbers of network star nodes. An example of a multiple star node network is the 200000 network star nodes equivalent to cell towers usable in the US. A CSK code generator creates CSK chipping pulse streams with pulse width probability distributions that are common to an unlimited number of unique orthogonal CSK codes. The CSK symbol codes, when correlated with non-matching local channel CSK symbol codes cause a further 3 DB spread of the original 4.575 MHz CSK symbol bandwidths, reducing the broadband interference potential by 3 DB in the demodulation process. This applies only to the own-code channel frequencies with post-product correlation bandwidth of 50 KHz bandwidth around each of 50 channel modulation center frequencies. A neighbor center frequency in the code channel is spaced 50 KHz in this embodiment. Only the non-coherent MIMO transmissions share the same set of 50 center frequencies for one channel of data transmissions. Each set of 50 channel frequencies are non-coherent with all other sets of MIMO transmissions on the same 50 frequencies. The MIMO CDMA sharing level is 20 allowing 20 independent code transmissions to be demodulated on the same set of 50 transmission frequencies from a network star node array. This received part of MIMO is common to the proven technology of concurrent tracking ability for 20 in-view US GPS and Russian GLONASS (Global Navigation Satellite System) satellites at any receive point in every second.

During the asynchronous CSK code generation process, a single integer sequence is first defined as a set of 1332 prime numbers containing 6 unique prime numbers. The root 1332 prime number distribution of counts includes 221 7s, 222 11s, 221 13s, 223 17s, 222 19s, and 223 23s. This root sequence of prime numbers is consistent with the sum of all prime number values that equals 20000. The random shuffle integer set is defined as 200 sets of 1332 shuffle integers and are generated and pre-saved to memory to support the CSK code generation processes. The XOR operation in this embodiment is defined as hexA XOR hexB XOR hex "F" that results in the inverse of hexA XOR hexB used as a common function, XORinv, in cross-correlations and this code generation process.

Each 1332 prime number tier0 index-shuffled set is designated either odd index tier0 or even index tier0 during the shuffle processes. After all index shuffle processes are completed on the odd index 1332 primes and even index 1332 primes, the two sequences are merged to form a 2664 tier0 prime number sequences that define a complete code set of 100 tier0 source codes. The odd index prime numbers define 1s pulse widths and even index prime number define 0s pulse widths in a long binary shuffled tier0 code. A 200-odd index by 200 even index tier0 shuffle set is applied to each pair of 1332 prime number sequences that when merged, create a 40000-bit random index shuffled tier0 binary code. The first pair of random shuffled 1332 prime numbers are merged to form the first full code set of 100 index shuffled tier0 binary codes. The 100-code set is then reformatted into 100 sets of 100 hex characters that define each 100 tier0 code set. The CSK generation process focuses on 100 tier0 codes at a time. Two tiers of XOR operations are applied to the hex character formatted 100 tier0 code set. The first code XOR transforms a 100 tier0 code to a 50 tier1 code set. The second XOR tier transforms a 50 tier1 code set to a 25 CSK code sets of this patent embodiment. The hex character format reduces the number of calculations in the tier0 XOR operations. The channel and frame file format for the retrievable CSK code files is consistent with a signal processing file path and associated network structure for signal processing system wireless modulation and demodulation time synchronous file retrievals with 250 frames in each channel 1-second epoch.

The CSK codes saved to memory for this embodiment are consistent with all files containing 10000 orthogonal CSK codes, saved to memory in 10000 lines of 100 hex characters each. The single 10000 orthogonal CSK code file defines a channel CSK frame of CSK codes. A supported signal processor has the option of using quadrature phase modulation where each pair of CSK codes from the frame file is used to select 2 CSK symbol codes based on the synchronous flow of two 4-bit half-bytes of data flowing to each quadrature phases modulator for one transport byte transmission. The receive function requires each CSK code to be used as the source of two sets of 16 CSK symbol codes that support multiple demodulators operating concurrently within the current 40 microsecond correlation slot. This allows 100 CSK symbol codes to be transmitted and received on a 50-frequency set with center frequency separations of 50 KHz. The code generation process that supports this quadrature orthogonal separation creates sets generates and saves 10000 orthogonal CSK codes per frame. All CSK codes in an epoch of 250 frames are orthogonal with cross-correlation fractions of chips lower values from −40/400 to −20/400 through upper values from +20/400 to +40/400. The retrieved CSK file of 10000 CSK codes supports a frame of 4 milliseconds containing 100 40-microsecond modulation slots. A unique set of 100 CSK codes from the 10000 CSK code file is transformed to 100 CSK symbol codes by the support signal processing system when merged with 50 bytes of transport data. The common receive time of day allows real time requests for each just-in-time retrieval to 10000 data CSK code sets per frame to support this process. The CSK data code generation process in this embodiment pre-saves multiple sets of 10000 orthogonal data CSK transport codes in one memory file for later synchronous retrieval of CSK 10000 code files per frame. The data 250 CSK code files define a 1-second epoch of orthogonal data CSK codes per channel. The supported signal processing system controls multichannel structures for sets of 20 channels using a code memory of CSK code file for 20 channels. This embodiment CSK code design is for a power spectral density profile with a bandwidth of 4.575 MHz at the −10 dB points. All data CSK codes and pilot CSK codes use a 10 MHz chipping rate and have a bandwidth of 4.575 MHz at the −10 dB points.

BRIEF OVERVIEW OF THE PRINCIPLES OF THE CSK CODE GENERATOR

The generator of orthogonal CSK codes of this invention begins with a pre-defined single set of 1332 prime numbers including 6 unique prime numbers. This set of 1332 primes forms fixed distribution of unique primes where the counts of the primes include: 221 7s, 222 11s, 221 13s, 223 17s, 222 19s, and 223 23s, and is referred to as the root prime number sequence. This prime number sequence is first index shuffled using a tandem shuffle where sets of 1332 shuffle integers index values replace the index of the original 1332 root prime number sequence index. Two sets of 100 shuffle integers are first applied to define 100 tandem-shuffled 1332 root prime number sequences. Two unique tandem shuffled half-codes are selected from each of the 2 tandem shuffled sequences. Each of the selected 4 shuffled prime sequences is again shuffled using a second set of 100 shuffle integers. The result is the definition of two independent sets of 100 pairs of 1332 shuffled original prime number sequences designated the original 100 pairs of 1332 data prime number 1332 sequences and the original 100 pairs of pilot 1332 prime number 1332 sequences. These shuffle processes use the complete 200 by 200 root index shuffle sets. The new shuffled prime number sequences are then labelled as a new original root prime sequence. These original-index shuffled data and original-index shuffled pilot pairs of 1332 index shuffle integers are used in unique pairs to create source index shuffled prime number sequences where each possible pair of 200 by 200 data shuffle 1332 sets and each possible pair of 200 by 200 pilot shuffle 1332 sets are applied to each of the original 100 shuffled prime sequences. This generates a maximum shuffled pair count of 40000×10000=400,000,000 total potential tier0 100 tier0 shuffled codes or 400 million×100=40 billion shuffled tier0 codes. This embodiment of 20 channels of 1-second epochs of CSK codes requires 10000 CSK codes per frame and 250 frames per epoch per channel. This is 2.5 million codes per channel with 20 channels using 50 million CSK codes in memory. The tier0 to CSK code ratio is 4 to 1 requires 200 million tier0 codes to be generated for transmit modulation functions and 200 million tier0 codes to be generated for receive demodulate function. The actual embodiment is capable of 40 billion tier0 shuffled codes which is sufficient to generate 10 billion CSK shuffled codes. The tier0 sequences are converted from prime number format to binary hex integer format and parsed into 100 hex integer sets for each tier0 code. Then 50 pairs of tier0 hex codes are selected and used for the application of 50 XOR logic operations. After one level tier0 code pair XOR operations the XOR output is 50 tier1 hex codes sets. The second level of code pair XOR operations is applied to 25 pairs of tier1 hex codes resulting in 25 CSK codes in the final hex code format of this embodiment. These code sets are collected into a file until 10000 CSK hex codes are collected and saved to memory for later time-synchronous retrieval of a frame of CSK codes by a supported signal processing system. The collection of 10000 CSK hex codes followed by the saving of 10000 CSK codes sets to memory define a 40-millisecond frame of CSK codes. A set of 250 unique files saved to memory define a complete 1-second transmit epoch and 250 unique files saved to memory define an additional 1-second receive epoch. Both of these epochs are reserved for 1 one channel of transmit and receive CSK orthogonal codes by the local communications network node usable by the supported communications system.

The tier0 codes shuffle processes do not change the power spectral density profile or the pulse width distributions for each shuffled tier0 prime integer sequence. An original 100 shuffled tier0 100 code sets is used as the source for creating 40000 shuffled pilot tier0 100 code sets or 40000 shuffled data tier0 100 code sets used as inputs to the tier1 and CSK code XORinv generation processes. Each of these 40000 sets of 100 shuffled tier0 codes is processed 100 tier0 codes at a time. A 1-second CSK code epoch has been arbitrarily defined in this embodiment. A data code channel frame in this invention is defined as a set of 100 sets of 100 CSK codes where 50 unique pairs of CSK codes modulate 50 closely-packed frequency channels. A 1-second epoch pilot CSK code and 1-second data CSK code memory has been arbitrarily filled in this embodiment that defines an epoch of 250 frames of 4 milliseconds each. A pilot CSK code channel is defined as including 250 frames of 100 sets of 100 pilot CSK codes. The pilot CSK codes depth is equal to the data CSK code depth only for convenience of a common code production method for a 1-second epoch. The pilot CSK codes optionally can use the available CSK symbol codes in the time synchronizing operations. With this embodiment, data CSK codes and pilot CSK codes can be functionally exchanged to establish a completely unique and orthogonal set of network CSK codes for data transport. There is no limit to the number of unique orthogonal CSK codes that can be generated under this invention, even with the same bandwidth and cross-correlation parameters.

The receiver reference time of day is provided by a supported signal processing system based on GPS (and Russian GLONASS) integrated receiver universal navigation and time inputs from the supported signal processing system to synchronize local time of day clocks. There are potentially 3 time of day clocks possible in this embodiment for MIMO client and network star node pairing options. The pilot transmissions from network clients in a network and from network star node units in a network with GPS-based universal time from each network star node kept within 2 nanoseconds of each other. This is equivalent to the GPS satellite array of downlink orthogonal codes that are non-coherent on the same transmit frequency that are within 2 nanoseconds in universal time relative to 20 other navigation transmissions to accommodate the navigation line of position processing in the GPS navigation system. MIMO configurations like GPS transmissions can also be implemented with this invention set of CSK codes to provide concurrent demodulation of at least 20 network star nodes data flows at 10 Mbps each. There are more than sufficient CSK codes to support receiving of 20 unique network star node transmissions of CSK symbol codes for downlink data flow to network client receivers of 200 Mbps. These are options possible with all CSK codes in memory under this invention. The client transmission system has the option for 1 to 20 code channels, one to each of 20 network star nodes to create non-coherent channel receive environments. A plethora of configurations are possible with data and pilot codes in memory to support many MIMO network configurations with low 4.575 MHz bandwidth at the −10 dB points for each option.

A supported signal processor network receive time of day and channel number are converted to a channel frame file path and pointers to 1 or more of the 10000 CSK codes in each file. The pilot and data CSK code set selector receives a synchronous just-in-time request from the support signal processing system for a CSK code file from the CSK code write read memory. The frame of 10000 orthogonal CSK data codes is retrieved early and available for all CSK data symbol processes. Each of these CSK codes are directly usable as sources of 16 orthogonal CSK symbol codes of the same length and power spectral density profiles. Each 4-bit half-byte transport data value is interpreted by the supported signal processing system as a CSK symbol code index of 0 through 15. Each index marks the start point 0 to 15 of the CSK symbol code. The 0 index is the original data CSK code. The hex "0" to "F" index refers to one of 16 start points in a self-concatenated CSK code hex format containing 200 hex characters. Generally, a CSK symbol code of 100 hex characters beginning at a start point in a self-concatenated CSK code is defined by:

Start-point (index number)=((index number)*6)+1

The hex "0" index number refers to the original CSK code. The remaining index numbers are defined by the expression for the hex-character start point above. The index is the 4-bits of data in the half-byte to be transported. This extraction means is usable as a one-step process by the supported signal processing system modulator or demodulator. This invention provides the applicable 10000 CSK code file that includes a frame of codes for the applicable channel and supported signal processing system time of day. The pilot and data time of day includes 250 frames of 10000 CSK codes each.

All CSK code files contain 10000 CSK codes for the code memory structure in this embodiment example. An example pilot code memory contains a non-repeating 1-second epoch of pilot CSK codes per channel that includes pilot codes for the 20-data channel case consistent with a 10 MHz chipping clock used in all modulators and demodulators. The data CSK code memory contains CSK codes for a non-repeating 1-second epoch of CSK codes including 250 frames of data CSK codes per channel, or 50 million data CSK codes per 20 channels. This is an example used in the embodiment. All parameters of the non-repeating epochs of CSK codes in memory are expandable if required by the supported signal processing system limited only by code memory limits in each system. All expansions do not degrade the cross-correlation parameters of the CSK codes generated. The CSK codes described are retrievable from memory prior to each 40-microsecond correlation slot. All acquisition search start points are consistent with star networks like cell towers arrays are relative to universal 1-second time tics and 4 millisecond frame tics in the receiving client or star node where all local universal time references are maintained at about 1 nanosecond accuracies relative to all others. All CSK symbol codes in a 1-second epoch are orthogonal and allow multiple searches of common pilot codes on the same frequency significantly reducing acquisition times. A MIMO concurrent network star node receive level can be as high as 20 concurrent same-frequency transmissions receivable by each MIMO client connected to 20 network star nodes. These detection configurations are like GPS-GLONASS navigation receivers in network client nodes today that acquire and track 20+ moving satellite nodes on a single frequency every second. A plethora of variable acquisition schemes are available using the memory-based pilot CSK code acquisitions to achieve CSK symbol acquisition times of a few milliseconds from each 1-second time tic from GPS. Once receive pilot CSK code correlation s-curve tracking is achieved for each of 20 receive pathways, stability of data CSK symbol code phase tracking is achievable by the supported client node signal processing system and IP data flowing from 20 network nodes interfaced with internet points of presence today. Tracking loops for range, Doppler, and acceleration parameters between client receiver and multiple network star node pilot transmissions are consistent with current navigation receiver tracking system methods. Also, the CSK codes in memory can be pathway structured to be consistent with any supported signal processing system CSK and quadrature phase shift modulation using the CSK code file synchronously retrieved from memory.

The pilot code acquisition time can be less than a few milliseconds with the CSK pilot codes 1-second epoch of this invention. Range and Doppler tracking across pilot CKS codes across multiple network star nodes and multiple client node pilots is possible. Multiple parallel searches stepping local retrieval phases allow several network star nodes to be detected at one time while searching across a common frequency-code combination extending through multiple CKS symbol code lengths. This allows time transfers for 20-star nodes to be detected in milliseconds line of sight zones in the US. The option for unique network star node codes for 20 network star nodes is also available consistent with unlimited CSK code sources.

The example signal processor data transmission quadrature isolation between all half-byte CSK symbol code transports minimize inter-code interference on the unique frequency channel. This eliminates false alarm rates in the CSK symbol code detection process in each channel. The CSK symbol code cross-correlation properties are consistent with the quadrature CSK code isolation signal processing sample of 100 data CSK codes concurrently transmitting on a set of 50 center frequencies with center frequency separations of 50 KHz consistent with the post-correlation bandwidth of 400 chip integrate and dump correlation processes. Each of 50 center frequencies contain 2 broadband but quadrature phase CSK code symbol spread modulations. Each modulation has a 4.575 MHz bandwidth at the −10 DB points.

The CSK symbol code cross-correlation parameters are unique to this invention and are made possible by the choice of the counts of each of unique 6 source or more prime integers in the root code. The use of prime numbers for the source root and tier0 codes eliminates harmonic sidebands in the final CSK codes power spectral density profiles after two XOR functions are applied to 50 pairs of original tier0 shuffled codes. The prime numbers used in tier0 pulse width selections also minimizes the CSK symbol cross-correlation interference parameters. The CSK codes and CSK symbol codes have a final common bandwidth of 4.575 MHz at the −10 dB points. Each of two-XORinv function processes result in the generation of CSK codes in this invention. Each XORinv function operation on the tier0 and tier1 codes increases the natural code bandwidth with each code XORinv function. Each of the 100 CSK codes in the correlation memory slot files provides a CSK symbol codes source to the supported signal processing system. Each CSK code allows the extraction of 1 to 16 symbol codes in the receive demodulator or the single indexed symbol code in the transmit modulator. The CSK symbol code index is determined by a signal processing system data half-byte value interpreted as the transmit symbol index. All CSK symbol codes are also orthogonal to all other CSK symbol codes in all code channels within the 250-frame code memory of this embodiment. A sample of mean cross-correlations across 256 possible between data CSK symbols indicates a stable distribution of cross-correlation absolute values of the mean on the lower side is −20 to −40 and on the upper side is 20 to 40 relative to the code autocorrelation value of 400. This indicates stable cross-correlation parameters across all CSK symbols possible are controllable by the CSK code design and generation processes to achieve mean cross-correlations within −20/400 to +20/400.

A plethora of variations of the root code and shuffled tier0 code prime number pulse width distributions and shuffle configurations consistent with 10 MHz chipping rates and various prime number distributions are possible in this invention. The occurrence of 1332 prime numbers in half-code lengths of 20000 chips include many pulse width distribution possibilities using 6 or more prime number pulse widths distributions. For example, a sequence of primes 7, 11, 13, 17, 19, and 23 in the tier0 codes can be varied in distribution parameters to include primes 3, 5, and 29 to create tailorable bandwidths from 2 MHz to 8 MHz bandwidth without side-lobes and without repeating codes within a defined long epoch of orthogonal CSK codes. All prime number distributions use a common 10 MHz chipping rate. Code lengths are consistent with a selected frame length and integer division consistency of code chips length, chipping rate, frame length, and carrier frequency that are state of the art system requirements in spread spectrum waveforms. For example, the embodiment code length of 100 hex characters can be extended to 200, 400, 500, 1000, 2000, 5000, or 10000 hex character code length without breaking the code length integer rules.

A plethora of shuffles such as the 1332 integer shuffle sets of this embodiment have options for unlimited numbers of unique and orthogonal CSK codes. The common parameters of all configuration options include the 10 MHz chipping rate, the 2664 pulse widths per 100 codes, and the 40000 chips per 100 codes. The 20000 chips per half-code tier0 pulse widths define only odd or only even index half-codes sequences across 100 codes. The tier0 prime number sequence orders are unique and define the count of unique 1332 prime number integers in each tier0 half-code sequence that are possible. The unique counts of 1332 sequences is unlimited. This is because the count falls in a large-number category above the number of stars in the universe which is estimated to be 10^29 (29 zeros). The upper bound of the number of unique index 1332 shuffles is 1332 factorial, or 2*10^3585 (3585 zeros). This count of unique tier0 100 code sets dwarfs the stars in the universe number and is therefore described as unlimited. A practical CSK code solid state memory limitation of 500 Gigabytes generally applies to the current technology level.

The CSK symbol code modulation and demodulation processes supported by the CSK codes of this patent will employ common modulation techniques that are provided the know symbol code to be extracted based on the synchronously received 4 bits of transport data. Each 4-bit half-byte is directly interpreted as the index of the CSK symbol code to be transmitted. A conventional pair of bi-phase modulators that form a quad-phase modulator on a center frequency is usable with CSK symbol codes. The demodulation processes have the local knowledge of 16 possible indexed CSK symbol codes, but do not know the actual CSK symbol code transmitted. To detect the transmitted CSK symbol code a CSK symbol code detector is required that performs 16 parallel integrate and dump operations across 400 binary bits within each 40-microsecond synchronously received correlation slot. Only 1 of the integrate and dump operations will create a linear energy slope from 0 to 400 across the 40-microsecond slot. The remaining 15 CSK symbol codes will reflect an integrate and dump profile that will result in a noise-like profile with upper bound at about +20 and lower bound at about −20 relative to the matching symbol code value of 400. This detection margin is 20 to 1 or greater equal to 13 dB or greater. This is an ample detector margin that instantly delivers the 4-bit code index to the receive data stream output. The detector described is a sample outside the scope of this patent, but within current technology for a binary code demodulator developer. A new graphene technology option will be available to developers to make the demodulator throughput speeds possible with the CSK codes of this patent.

BRIEF DESCRIPTION OF THE DRAWINGS

FIG. 5 shows the tier0 and CSK pulse width distributions, and for comparison, the power spectral density of a classic pseudorandom noise codes.

FIG. 6 shows a data CSK 16-symbol code generation from a concatenated set of two CSK codes in binary format.

FIG. 7 describes the CSK absolute value maximum and mean values of cross-correlation across 256 CSK symbol codes and includes the autocorrelation value of the autocorrelation matching peak of 400 for the original CSK symbol code.

FIG. 8 shows the local matching autocorrelation of with matching CSK code collapsing bandwidth to 50 KHZ and CSK code original power spectral density profile, and post-correlation operation with non-matching CSK codes resulting in the non-matching CSK cross-correlation power spectrum with over 8 MHz bandwidth at −10 DB points.

FIG. 9 shows a sample 256 sets of CSK symbol cross-correlations absolute value counts for cross-correlations in 50 CSK code sample set common to the in-phase sets of CSK symbol transmissions per channel.

FIG. 10 shows the structure of CSK codes file storage for 300 channels of CSK codes.

FIG. 11 shows the detail generation processes of three half-code 1332 shuffle operations for the three types of shuffles presented in the patent. These include the root 1332 distribution shuffle set, the pilot 1332 pulse width tier0 shuffle set, and the data 1332 pulse width tier0 shuffle sets.

FIG. 12 shows a general CSK codes cross-correlation s-curve single peak phase tracking profile commonly used in spread spectrum systems acquisition and tracking by supported signal processing systems.

FIG. 13 shows the detail of a standard binary code s-curve tracking curve representing a support signal processing system voltage controlled oscillator control profile that adjusts a local voltage controlled oscillator toward the central phase synchronization point to maintain the tracking of receive time of day.

DETAILED DESCRIPTION OF THE INVENTION

Figure 1:
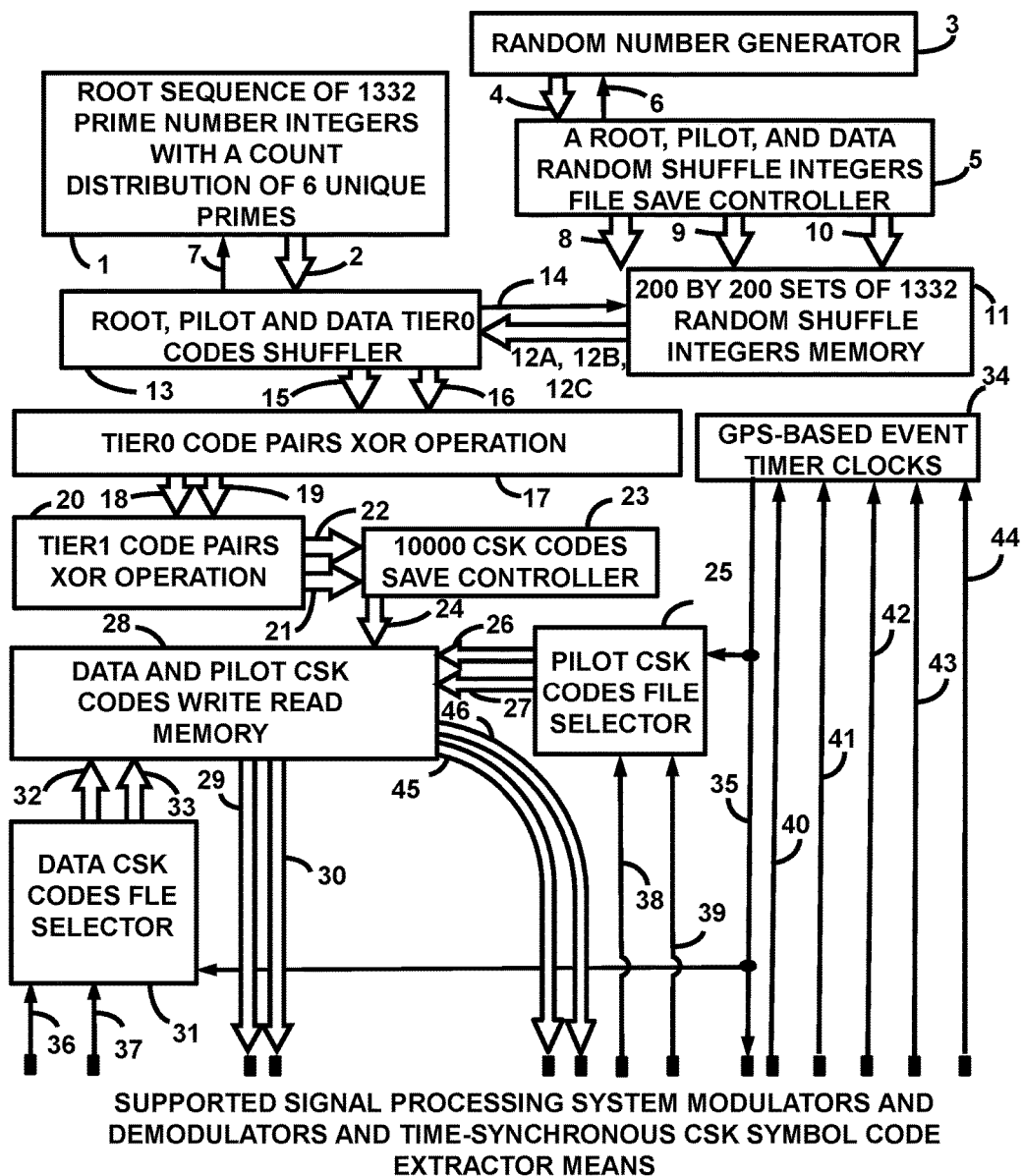
FIG. 1 shows the random non-cyclical binary CSK code generator overview.

The detail in FIG. 1 describes the overview of the random non-cyclical binary CSK code generator that creates 1-second epochs of data and pilot CSK orthogonal non-repeating codes for use by a plethora of possible signal processing systems. These CSK codes span an epoch of 250 frames that include 100 sets of 100 CSK codes per channel per frame where each code is the source of 1 of 16 CSK 4-bit symbol codes usable by supported signal processing systems controlling modulators and demodulators. The data CSK codes are retrieved from memory consistent with the receive GPS-based time of day voltage controlled precision time-of-day oscillators. Each demodulator contains multiple phase search processes that apply multiple phase tracking s-curves in a supported spread and de-spread signal processing system. The pilot codes and data codes in memory span a 1-second or more epoch with a chipping clock of 10 MHz without repeating CSK codes and support a pilot CSK code acquisition and tracking process within a support signal processing system. In FIG. 1 the root, pilot, and data 1332 random shuffle integers file save controller 5 creates random unique integer sets for 1332 integer shuffle operations. The random number generator 3 provides requested random numbers for shuffle sets generator 4 based on the random number request including the associated random number generator seed 6. Only unique random decimal numbers used to define each of 1332 random integers are accepted in response to random integer requests 6. Three pairs of 1332 random shuffle integer files are generated by the 1332 random integer shuffle file controller. These file groups include a 200 by 200 root 1332 integer shuffle files set 8, a 200 by 200 pilot 1332 shuffle files set 9, and a 200 by 200 data 1332 shuffle files set 10. The shuffle root primes flow control 7 from the root, pilot, and data tier0 codes shuffler 13 results in the retrieval of the single root 1332 integers sequence flow 2 from the root sequence of 1332 integers with a count distribution of 6 unique primes 1 from fixed memory. The root, pilot and data tier0 codes shuffler 13 controls all shuffle processes applied to the source root sequence of 1332 prime number integers with a count distribution of 6 primes 1. These root shuffle operations randomize the indices of the original root sequences of 1332 sets of prime integers 1 multiple times. The first shuffle set includes 50 tandem shuffle sets of 1332 unique integers. The second shuffle set includes 50 tandem shuffle sets of 1332 unique integers defining an odd index and even index root set. Four selected tandem-shuffle 1332 sets form the 4 sources of follow-on shuffles. These shuffles define two groups of 100 shuffle sets of 1332 unique integers referred to as 100 pairs of original data root shuffles and 100 pairs of original pilot root shuffles. The 200 by 200 sets of 1332 random shuffle integers memory 11 is used to shuffle the 100 pairs of original data root shuffles in response to requests 14 from the root, pilot and data tier0 codes shufflers 13 to provide the applicable 200 by 200 sets of 1332 random shuffle integers 12B or 12C. Each of these pairs of shuffled 1332 prime integers are designated as odd shuffles and even shuffles where 100 shuffle pairs of prime numbers sequences. Each 200 by 200 shuffle set are individually used to create a final tier0 shuffled 2664 code. The total possible data tier0 codes produced include 40000 tier0 codes from the 200 by 200 shuffle set plus a total of 10000 unique original tier0 pairs of shuffle prime number 1332 prime numbers. The maximum sets of 100 tier0s generated with this embodiment is 40000×10000=400 million sets of 100 tier0 code sequences. Each set of 100 codes are then converted from prime number sequences of 2664 prime numbers to 10000 hex numbers where each hex number represents 4 binary bits of code in the set of 100 codes. The first original pilot 100 tier0 codes are collected into 100 pilot tier0 codes 15 and original data 100 tier0 codes are collected into 100 data tier0 codes 16. The tier0 code pairs XOR operation 17 produces 50 pilot tier1 codes and separately 50 data tier1 codes that are formatted into 25 pairs of pilot tier1 codes 18 and 25 pairs of data tier1 codes 19 and sent to the tier1 code pairs XOR operation 20. Here the XOR results in the outputs of 25 pilot CSK codes 21 or 25 data CSK codes 22 sent to the 10000 CSK codes save controller 23. When all 100 CSK codes of pilot or data CSK codes are collected, the 100 CSK codes save controller 23 formats 100 CSK codes into one file forming the CSK codes flow to memory 24 to the data and pilot CSK write read memory 28. This memory is asynchronously filled to the CSK code file capacity required by the supported signal processing system. All files contain 10000 CSK codes for a frame of data transport ready for use by the supported signal processing system. A defined module of codes is placed in memory for 1-second epochs across 20 channels of pilot and 20 channels of data codes where each channel contains 1-second epoch of 250 frames of 10000 CSK code sets where each frame is 4 milliseconds in length. The pilot CSK codes file selector 25 and the data CSK code file selector 31 perform the CSK code file time-synchronous retrieval of the CSK code files consistent with the time stamp for receive data CSK code file 36, the time stamp for transmit data CSK codes file 73, the time stamp for receive pilot CSK codes file 38, and the time stamp for transmit pilot CSK codes file 39. The data CSK codes file selector translates these time stamps to the pathway addresses of the CSK code files in memory. For a 1-epoch of data and pilot CSK codes, this process outputs actual memory addresses including the channel directory and the actual 100 CSK code file in the applicable 1-second epoch. For the data CSK, the path address for receive data CSK code file 32 and path address for transmit data CSK code file 33 is provided to the data and pilot CSK codes write read memory 28. For the pilot CSK, the path address for receive pilot CSK code file 26 and path address for transmit data CSK code file 27 is provided to the data and pilot CSK codes write read memory 28. The data and pilot CSK codes write and read memory 28 returns the requested CSK file directly to the supported signal processing system using receive synchronous 10000 data CSK code files 29 and transmit synchronous 10000 data CSK code files 30, and the receive synchronous 10000 pilot CSK code files 45 and transmit synchronous 10000 data CSK code files 46. A supported signal processing system distributes synchronous event time references 35 and universal time offsets 40 to the event timer clocks 34. The master frequency reference 41 from the supported signal processing system distributes a stable master frequency to the event timer clocks 34. The event timer clocks 34 parse the precision time received from a support signal processor to a set of synchronous event time references 35 that are made available to the data CSK codes file selector 31 and pilot CSK codes file selector 25. The pilot acquisition status 42 is delivered to the event time clocks 34 for acquisition and tracking mode status. The channel carrier frequencies 43 and universal time of day 44 are also provided to the event timer clocks 34 for distribution. The transmit and receive time of day universal time offsets 40 are also provided to the event time clocks for reference to the pilot CSK codes file selector 25 in the synchronous event time references 35.

Figure 2:
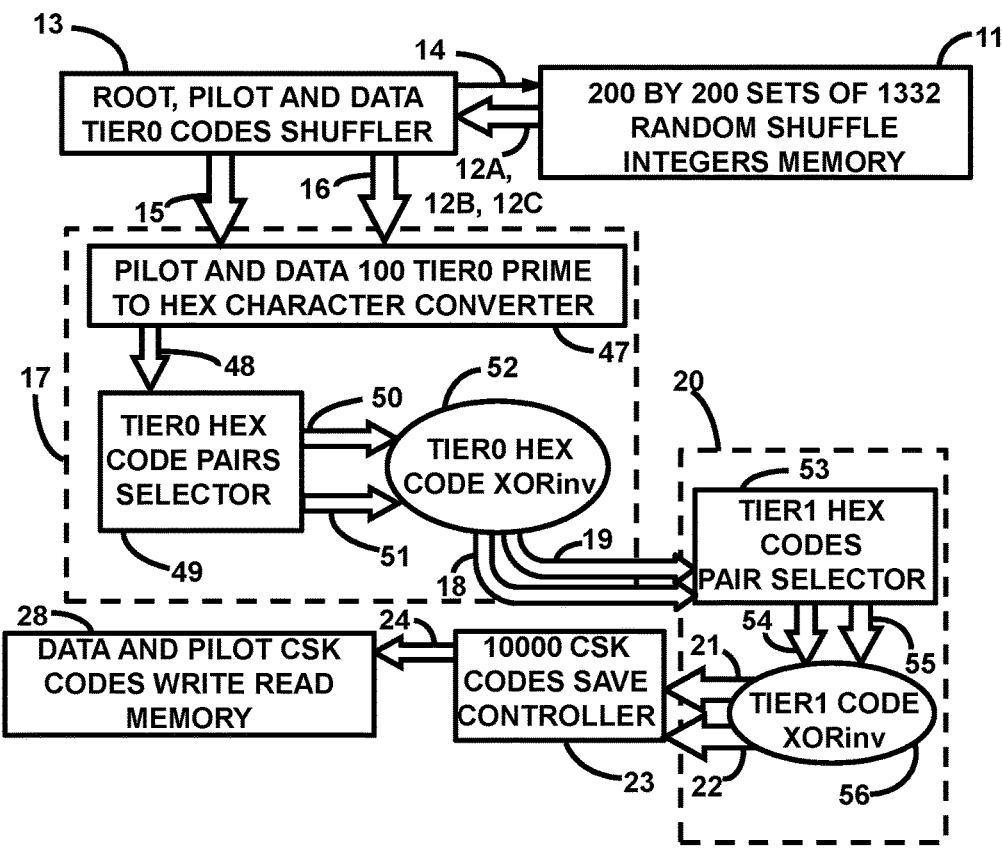
FIG. 2 shows the random non-cyclical binary CSK code generator processing tiers detail.

The detail in FIG. 2 describes the random non-cyclical binary CSK code generation elements associated with the creation of shuffle integer files, the tier0 shuffle processes, and the tier0 and tier1 XORinv operations resulting in the generation of the CSK code files for memory storage. The details begin with the pilot and data 100 tier0 prime to hex character converter 47 that delivers hex character code output 48 in tier0 hex code pairs format to the tier0 hex code pairs selector 49. Two outputs include either a pair of pilot hex format codes 50 and 51, or a pair of data hex format 50 and 51. These outputs are inputs to the tier0 code XORinv operation resulting in the 25 pairs of pilot codes 18 or 25 pairs of data codes 19 forming the inputs to the tier1 code pairs XOR operation 20. This process begins with a tier1 hex codes pair selector separating pilot hex code pairs from data hex code pairs to form pilot or data hex code pairs in inputs 54 and 55 to the tier1 cod XORinv function 56. The tier1 code XORinv delivers either 25 pilot CSK codes 21 or 25 data CSK codes 22 to the 10000 CSK codes save controller 23. Sets of 25 CSK codes are collected and formatted into one file of 10000 CSK codes 24 and sent to the data and pilot CSK codes write and read memory 28.

In FIG. 2 the event timer clocks 34 collect and distribute synchronous event time references 35. The sourced of these time references include universal time offsets 40, master frequency reference 41, pilot acquisition status 42, channel carrier frequencies 43, and universal time of day 44. The receive synchronous 100 data CSK code files 45 and transmit synchronous 100 data CSK code files 46 plus the receive pilot CSK code files 29 and transmit pilot CSK code files 30 when needed are retrieved from memory 28 and provided to the supported signal processing system for pilot and data modulation and demodulation. The elements addressed at the top of the Fig include the root, pilot and data tier0 codes shufflers 13 that initiates the first shuffles in the Figure. The next level of shuffles is completed by the 200 by 200 sets of 1332 random shuffle integers retrieved from the 200 by 200 sets of 1332 random shuffle integers memory 11. The requests for these shuffles 14 result in the delivery of the applicable pairs of 1332 random shuffle integers including set 12A or 12B or 12C usable in the tier0 shuffles of the original pilot or data root shuffled sets. The resulting outputs include the original 100 pilot tier0 code pairs 15 or original 100 data tier0 code pairs 16 is shown within the 17 dash-line boundary. This boundary contains a pilot and data 100 tier0 prime number format to hex character converter 47, followed by a tier0 hex code pairs selector 49, followed by a tier0 hex code XOR 52. The hex character codes format 48 create a source of tier0 hex code pairs used by the tier0 hex code pairs selector 49 to provide a unique pair of tier0 hex codes. and interface 50 and interface 51 to the tier0 hex code XOR 52. The XOR outputs from pilot tier0 pairs define 50 pilot tier1 codes 18 and the outputs from data tier0 pairs define 50 data tier1 codes 19. The sets of 50 tier1 codes are processed within the 20 dashed-line boundary. The first operation is the tier1 hex codes pair selector 53 the selects unique tier1 hex codes pairs for the tier1 code XOR 56. These pairs are either pilot tier1 code pairs or data tier1 code pairs that define 25 pairs of tier1 codes. The tier1 code XOR outputs either 25 pilot CSK codes 21 or 25 data CSK codes 22 to the 100 CSK codes save controller 23.

At the bottom of FIG. 2 are the synchronous timing signals from the supported signal processing system include the master frequency reference 17, the receive pilot acquisition status 18, all provided to the event time clock 21. The synchronous event time reference 16 is distributed to the data CSK codes file selector 34 to provide the timing references. The data CSK codes file selector 34 receives a time stamp for receive data CSK code file as a file request 37 and a time stamp for transmit data CSK code file as a file request 38. The CSK codes file selector 34 converts time to receive data CSK memory path addresses and outputs path address for receive data CSK code file 35 and path address for transmit data CSK code file 36 to the data and pilot CSK codes write read memory 26. The memory response is an immediate output of the data CSK 100 code file including the synchronous receive 100 data CSK code sets 27 and the synchronous transmit 100 data CSK codes sets 28 to the supported signal processing system. The pilot CSK codes file selector 31 receives a time stamp for receive data CSK code file as a file request 39 and a time stamp for transmit data CSK code file as a file request 40. The pilot CSK codes file selector 31 converts time to receive pilot CSK memory path addresses and outputs path address for receive pilot CSK code file 32 and path address for transmit pilot CSK code file 33 to the data and pilot CSK codes write read memory 26. The memory response is an immediate output of the pilot CSK 100 code file including the synchronous receive 100 pilot CSK code sets 29 and the synchronous transmit 100 pilot CSK codes sets 30 to the supported signal processing system. The timing reference for these events include the universal time offsets 41 from universal time. The detail within the tier0 code pairs XOR operation 17 begins with the pilot and data 100 tier0 prime to hex character converter 47 that provides hex character format code outputs 48 to the tier0 hex code pairs selector 49. The selector separates tier0 hex codes A 50 and tier0 hex codes B 51 forming a pair for the tier0 hex code XOR operations 52. The outputs from this XOR are either 25 pairs of pilot tier1 codes 18 or 25 pairs of data tier1 codes 19 to the tier1 hex codes pair selector 53. The selector delivers either tier1 hex codes A for tier1 hex code XOR Input 54 and tier1 hex codes B for tier1 hex code XOR input 55. This pair of tier1 codes are delivered to the tier1 code XOR operation 56. The outputs of the tier1 code XOR include 25 pilot CSK codes 21 or 25 data CSK codes 22. These CSK codes are collected by the 10000 CSK codes save controller 23 and formatted for synchronous file retrieval 24 and sent to the data and pilot write read memory 28 for time synchronous retrieval by a supported signal processing system.

Figure 3:
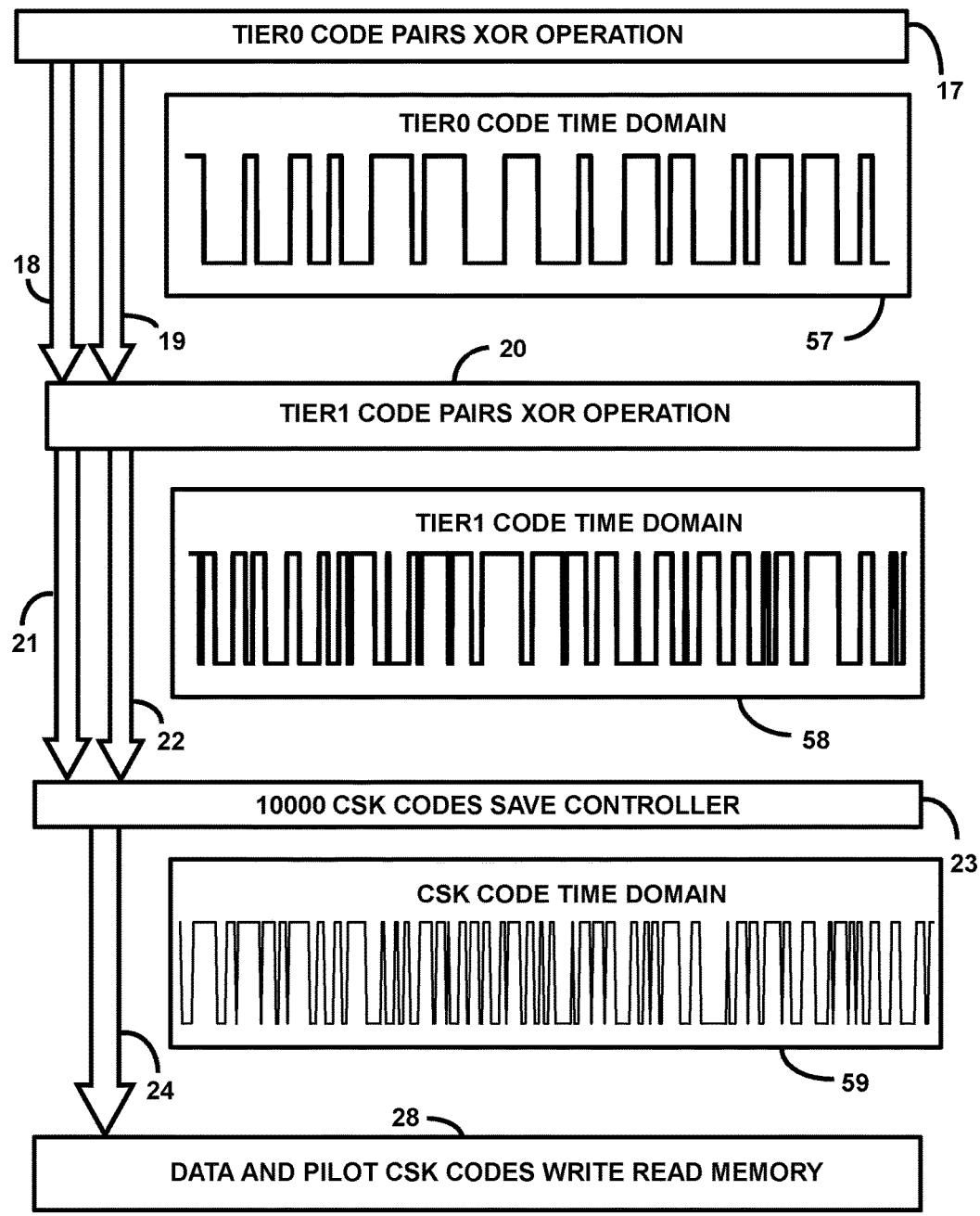
FIG. 3 shows tier0 to tier2 code XORinv and code time domain examples.

In FIG. 3 I describe the tier0 to tier2 code XORinv and code time domain examples. The initial tier0 process applicable to the data and pilot tier0 codes processes is performed by the tier0 pairs XOR operation 17 that produces tier1 codes outputs including 25 pairs of pilot tier1 codes 18 and 25 pairs of data tier1 codes 19. These pairs are sent to the tier1 code pairs XOR operation 20 that outputs 25 pilot CSK codes 21 and 25 data CSK codes 22 to the 10000 CSK codes save controller 23. This save controller collects 10000 CSK codes delivered to it and formats them in a CSK file format for CSK codes flow to memory 24. This flow is given a file name consistent with a frame of CSK codes and sent to the data and pilot CSK codes write read memory 28. A sample time domain view of the tier0 code time domain 57, the tier1 code time domain 58, and the CSK code time domain 59 is shown for codes comparisons.

Figure 4:
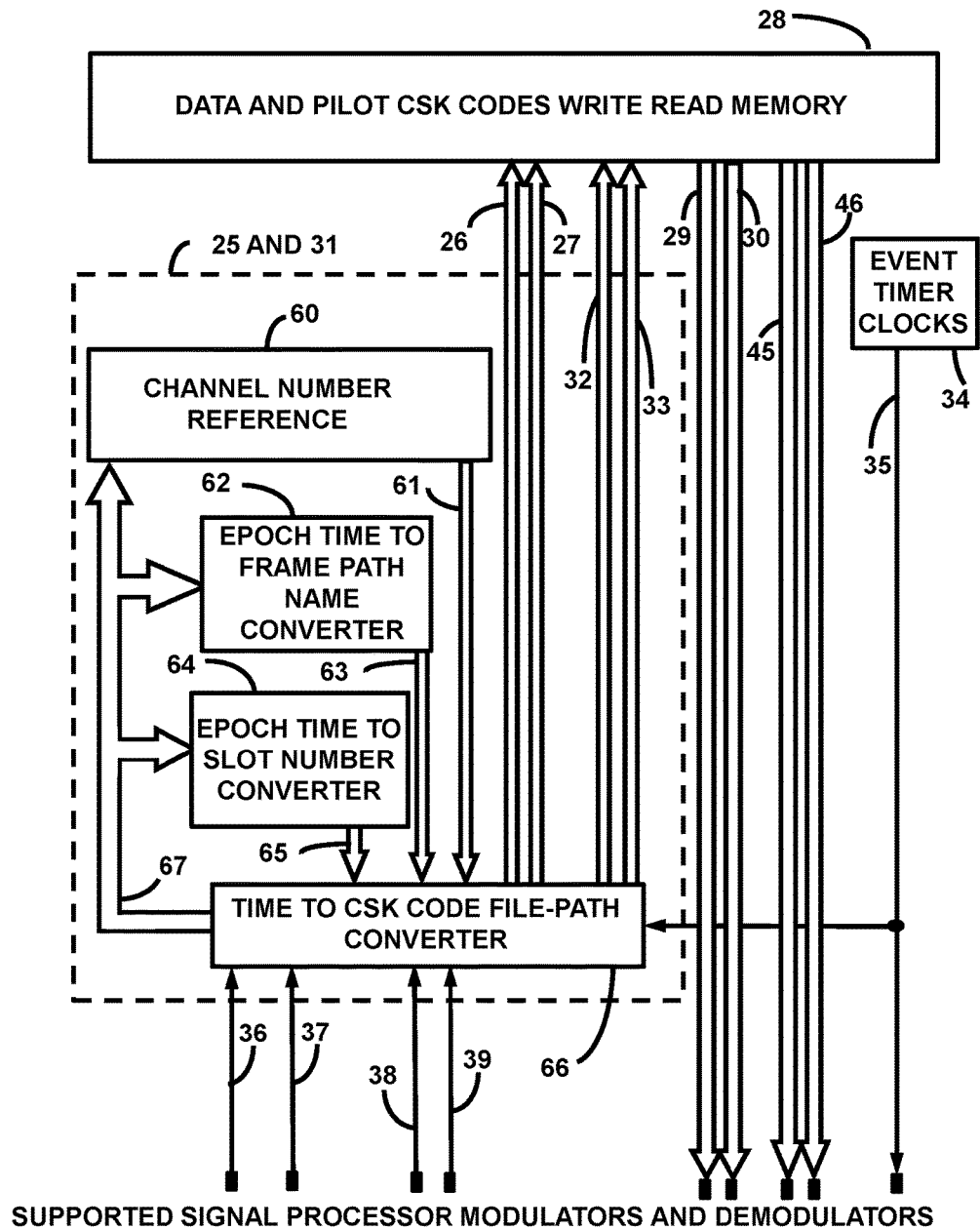
FIG. 4 shows the CSK code file selector with indexing structure for a 100 set of CSK codes in memory.

In FIG. 4 I describe an embodiment functions of the data and pilot CSK code file selector conversion of the supported signal processing system time of day parameters to a specific correlation slot memory address in the data and pilot CSK code write read memory 28. These inputs to the group of elements within the data CSK file selector (dotted box) 31 and the pilot CSK set selector 25 shown here as a single functional element, but for timing efficiency there are two separate elements that support either data time of day or pilot time of day. Both data and pilot processing inputs are shown here. The data inputs from the support signal processing system include time stamp for receive data CSK code file as a file request 36 and the time stamp for the transmit data CSK code file as a file request 37. The pilot inputs from the support signal processing system include the time stamp for receive pilot CSK code file as a file request 38 and the time stamp for the transmit pilot CSK code file as a file request

39. The data CSK code file selector 31 and the pilot CSK code file selector 25 convert the time stamps to code file path addresses of the CSK code file in the CSK codes write read memory 28. The path address for receive data CSK code file 32 and path address for the transmit CSK codes file 33 is sent to the CSK codes write read memory 28, which immediately responds with receive synchronous data CSK code file 45 and the transmit synchronous data CSK code file 46. The path address for the receive pilot CSK code file 26 and the path address for the transmit pilot CSK code file 27 are sent from the pilot CSK code file selector 25 to the CSK codes write read memory 28, which immediately responds with the receive synchronous pilot CSK code file 29 and the transmits synchronous 100 pilot CSK code set 30. The event timer clock 34 distributes the synchronous event time references 35 to the time to CSK code file-path converter 66. The channel number is included in the input file requests 36, 37, 38, and 39 received by the time to CSK code file-path converter 66. The time to data and CSK epoch time to slot number converter 64 internal processing elements include the channel number reference providing formatted channel number part 61 from the channel number reference 60 to the time to CSK code file-path converter 66 of the pathway, the epoch time to frame path name converter 62 providing formatted frame number part 63 and the epoch time to frame path name converter 62 providing the formatted slot number file name 63. The slot number reference 65 provides the slot number part of the file name. The epoch time stamp 67 is the source of synchronous time reference for the breakdowns into frame and slot.

In FIG. 5 I describe the CSK dedicated chips per unique CSK pulse width in chips compared to the tier0 dedicated chips in the root 20000 chip base distribution where the tier0 code generator established the count distribution of 6 specific prime integers 7, 11, 13, 17, 19, and 23. Column 1 pulse width is the reference column of all possible pulse widths 68. The total tier0 root chips dedicated to each of these unique pulse widths 70 is shown in the third column common to all sets of 1332 pulse widths that determine the odd index or even index code pulse distribution. The CSK dedicated chips to each of the pulse widths after two code XOR operations 69 is shown in column 2 totaling 1332 pulse widths results in a 4 MHz bandwidth chipping waveform. The shuffled tier0 distribution is also common to all shuffled tier0 codes. The comparisons of a classic pseudorandom noise (PN) code created with classic PN shift register power spectral density with 10 MHz chipping clocks 72 is a typical broadband spread spectrum main lobe profile. The power spectral density of CSK codes generated by this patent 73 also has a 10 MHz chipping clock. The power spectral density bandwidth between the right and left −10 DB points is 4.575 MHz. The root tier0 shuffled codes power spectral density profile 74 is much narrower bandwidth around 1.25 MHz with very low power profiles between the 10 MHz null points. The tier0 codes profile is much more rugged than the CSK codes. There are 2 tiers of XOR code level operations before the CSK codes are define resulting in the smooth CSK code power spectral density 73 and the increased bandwidth to 4.575 MHz at the −10 DB points. Both tier0 and CSK code power spectral density profiles do not have side-lobes present outside the first nulls whereas the next side-lobe of the PN power spectral density profile has a −14 DB peak. This is because the root tier0 100 codes sets have only 6 prime number unique pulse widths that do not combine to form side-lobes. These digital code profiles are (sin x/x)^2 summation calculations including each unique pulse width in the applicable binary code. The total summations of all sin x/x calculations at each frequency plotted is completed at frequency steps of 25 KHz 71. The power density in the vertical axis is scaled in DB. All shuffled tier0 codes with odd and even 1332 merged sets have the rugged bandwidth of 1.175 MHz at the −10 dB points.

In FIG. 6 I describe the data CSK symbol code 16-symbol code extraction-means provided to the supported signal processing system to define 1 to 16 CSK data symbol codes from each CSK code retrieved from memory. The CSK code is concatenated to itself 75 forming the CSK symbol code binary bit source. The original CSK codes and CSK symbol codes are formatted into 100 hex-character sequences. Each CSK symbol code of the 16 symbols is indexed beginning at 0 shown as symbol 00 76 which marks the hex character start point of the original CSK code. The next symbol 01 77 begins at hex character index 7 that defines a 6-hex character separation equal to 24 binary bits between symbol start points. The index 02 symbol code begins at hex character 13 marking the next CSK symbol code hex-character start point 78 with this 6-hex character spacing pattern continuing until symbol index 15 79 with start point at hex character (15× 6)+1=91. Therefore all 16 CSK symbol codes logically have a start point within the first 100 hex characters with each extending across the following 99 hex characters within the self-concatenated CSK code 80 of length 200 hex characters received by the supported signal processing system.

FIG. 7 shows the results of data CSK symbol codes cross-correlation performance relative to the single autocorrelation integrate-and-dump value of 400 chips over a large sample of 1225 CSK symbol code pairs. Each CSK pair is viewed as a cross-correlation value of 2 sets of 16 CSK symbol pairs that have 256 possible cross-correlation values per CSK code pair. The top plot of FIG. 7 shows the maximum of absolute values of a given pair of CSK symbol codes in the 256 sample of cross-correlations. The bottom plot shows the absolute value of the mean of 256 symbol cross-correlations for a single pair of CSK codes. There are 50 pairs of CSK codes and 1225 CSK unique pairs with 256 symbol cross-correlations applicable to each CSK pair. The mean of the many sets of 256 symbol cross-correlations shows a stable absolute value zone with a mean of close to 21 84. The vertical axis 81 shows correlation values from 0 to 450 with the autocorrelation value of 400 at the center 82. The CSK symbol cross-correlation absolute value maximum across 256 CSK symbol pairs 83 is an absolute value statistical distribution with values between 120 and 32. The cross correlation maximum values and mean values include samples starting at 1 and going to 1225 representing CSK code pair samples for 256 symbol cross-correlation absolute values. The complete set of 256 CSK symbol pair cross-correlation samples applies to each of 1225 CSK code pair samples.

FIG. 8 shows the CSK power spectrum with 4.575 MHz bandwidth at −10 dB points 87 and the non-matching CSK code cross-correlation samples 88 plotted in dB scale. The nulls at 10 MHz bands to the right and left 89 are common to all CSK codes and CSK symbol codes with 10 MHz chipping rate. The cross-correlation process on an incoming broadband 4.575 MHz bandwidth symbol code results in a new 2xb bandwidth of over 8 MHz at the −10 DB points 88. This power spectrum is also reduced at the peak by about −6 DB relative to the original CSK symbol codes. All power spectral densities have nulls as shown 89 as all CSK symbol codes operate with a 10 MHz chipping clock. The narrow peak add-on 86 represents the autocorrelation spectrum associated with the post correlation de-spread of the original broadband energy across 400 autocorrelation chips. The 4

MHz original bandwidth of energy is de-spread to 50 KHz across between main lobe post-correlation energy. All energy under the CSK symbol code 87 is de-spread to the narrow 50 KHz post-correlation power spectral density 86. The vertical axis 85 is in steps of 10 dB consistent with the power spectral density curves.

FIG. 9 shows the details of the CSK cross-correlation value histogram across all possible pairs in a 50 CSK symbol code set of unique orthogonal symbol codes. The sample peak of the sample counts 91 occurs near the center of the cross-correlation sample count values that are slightly biased to the right. The vertical axis 90 is scaled in sample counts from 0 to 100. The horizontal axis at the bottom 92 is labelled from 2 to 122 in 2-count steps. A pattern edge sample 93 shows the count of 1 for sample cross-correlation value of 104.

FIG. 10 shows a sample of the CSK codes file storage structure. The top directories are the pilot and data CSK channels 94 that have pathways 95 to all frame directories 97. There are 250 frames per data channel 97 with data file pathways 98 to each frame containing 20 channel data CSK files 97. Pilot CSK files 100 are located by the channel number and file count in the pathway 96 pointing to a specific time synchronous 40 microsecond correlation slots and frame in the pilot and data epoch of 1 second. The data CSK files 99 are similarly located by data file pathways 95. The path to the pilot CSK code files 96 lead from the applicable channel directory to 250 files of 100 pilot CSK codes each supporting a 1-second epoch of pilot and data CSK codes per channel controlled by the signal processing system during acquisition and precision universal time setting functions.

FIG. 11 shows the details of the 1332 shuffle integer set generators 11 and the root, pilot, and data tier0 shuffler 13. Also expanded is the 1332 shuffle integer set generator 5. The distribution of the counts of 6 prime numbers is initially set as shown in root sequence of 1332 integers 1. The root sequence of prime numbers 1 receives requests for the sequence 7 and delivers the unshuffled 1332 prime sequence 2 to the root, pilot and data tier0 codes shuffler 13. The 1332 shuffle integer set generator 5 is expanded to show the three 1332 integer shuffle file generator 102 and the shuffle file retrieval controller 101. The integer shuffle file generator 102 creates the shuffle files 8 for the 200 by 200 1332 root shuffle integer files for data and pilot source 103, the shuffle files 9 for the 200 by 200 pilot 1332 shuffle integers files 108, and the shuffle files 10 for the 200 by 200 data 1332 shuffle integers files 111. These three shuffle source files are created and saved and retrieved in selected file sets by the shuffle file controller 101. The two independent shuffle integers include 200 odd index data 1332 tier0 shuffle integers 109 and 200 even index data 1332 tier0 shuffle integers 110. The root primes set 114 is shuffled resulting in root 1332 prime integers to odd tandem shufflers 115. Similarly, the even tandem shuffler outputs even index shuffle integers 123. The control commands from the shuffle retrieval controller 101 are sent in one logic command flow path 14 to each of the three 200 by 200 shuffle files 11. The results of these commands include the flow of selected shuffle files to the elements of the root, pilot, and data tier0 codes shufflers 13. Three sets of shuffle files from each of the three shuffle source files 11 include the shuffle files 105 for the odd tandem shuffler 117, for the even tandem shuffler 122, for the odd index original tier0 generator 119, and for the even index original tier0 generator 124. These flow lines are clustered in a group logic sets of flow lines labeled 12A. The 12A cluster includes shuffled files for the odd index original tier0 generator 104, the shuffle files for the odd tandem shuffler 105, the shuffle files for the even tandem shuffler 106, and the shuffle files for the even index original tier0 generator 107. A second set of shuffle files from the 200 by 200 pilot 1332 shuffle integers files 108 are grouped under logic sets of flow lines labeled 12B. This group includes flow lines to the odd index 1332 pilot tier0 shuffler 131 and even index 1332 pilot tier0 shuffler 133. Similarly, a third set of shuffle files from the 200 by 200 data 1332 shuffle integers files 111 are grouped under the label 12C. This group includes 200 odd index data 1332 tier0 shuffle integers 112 to the odd index 1332 data tier0 shuffler 127 and the 200 by 200 data 1332 shufflers 113 to the even index 1332 data tier0 shuffler 129. These three groups of selected shuffle files provide the unique 1332 sets of random sequence integers used by each shuffler to reorder the sequences of 1332 prime integers also received by these shufflers. The 1332 integer sets provide unique index orders that replace the original index order of the input prime number sequences resulting in new non-repeating prime number sequences at the tandem shuffle levels, the original tier0 generator shuffle levels, and the final pilot and data tier0 shuffle levels. All shuffled pilot and data tier0s are delivered to the converter from prime number sequences to hex sequences 135 and result in the transfer of hex format tier0 code pairs including sets of 50 pilot tier0 code pairs 15 and 50 sets of data tier0 code pairs 16 delivered to the tier0 code pairs XOR operation 17. The final outputs to the converter from prime number sequences to hex sequences include the even index shuffled tier0 codes 130, the odd index shuffled tier0 codes 128, the even index shuffled pilot tier0 codes 134, and the odd index shuffled pilot tier0 codes 132. The shuffled 1332 output sets that lead from these final shuffled files to the converter from prime number sequences to hex sequences 135 include the odd index shuffled tandem sequences 118 and even index shuffled tandem sequences 116. At the next level, the odd index shuffled original tier0 generator 119 outputs include the odd index shuffled original pilot tier0 sequences 120 and odd index shuffled original data tier0 sequences 121. The parallel even index outputs include the even index shuffled original pilot tier0 sequences 125 and odd index shuffled original data tier0 sequences 126.

FIG. 12 shows the autocorrelation and cross-correlation parameters for a sample data or pilot CSK code relative to different phases of the same CSK code. The CSK symbol code 400 chip energy corresponding to the matching chip phase is shown at the peak value of 400 138. A left side phase offset of 2 chips is shown near half way to the peak value 139 and right-side offset of 2 chips is shown near half way to peak value 140. The horizontal axis of integers shows the sample index values 136. The vertical axis shows the cross-correlation integers from 0 to 450 values 137.

FIG. 13 shows the pilot CSK binary chip pilot receiver means of precision local time-tracking with a commonly used tracking S-curve provided to the receiving signal processing system. The S-curve in this embodiment has a 4-chips time phase separation between two offset positive and negative peaks that form a negative correlator B offset of 2 chips to right of the autocorrelation peak that is subtracted from correlator A offset 2 chips to left of autocorrelation peak. The difference of each correlation pair is plotted chip by chip offset across several chips to form the tracking S-curve shown here. The S-curve left 2-chip offset peak near 400 shows the correlation energy difference between a left-offset correlation and a right offset correlation difference 141 that represents the early peak. The S-Curve energy left and right offset correlation difference value by 2-chip offset 142 that represents the late peak. The S-curve two control regions include the early control point 144 and the late control point 145 with arrows at each point indicating the direction of phase control in a voltage controlled oscillator. A precision digital version of this control process is anticipated with today's technology. The zero-error phase point is indicated at the center 143 where the local CSK symbol phase matches the receive demodulated symbol code phase. The vertical axis correlation energy 147 extends from −450 to +450 as shown. The horizontal axis is phase offset in chips 146 extends from −9 chips early to +4 chips late. The chip-count shown is general left to right in chips and does not indicate early-late parameters. The central control values are near linear between the two phase-control peaks.

What is claimed is:

1. A generator of memory-based CSK codes each capable of logical extraction of 16 orthogonal CSK symbol codes that are usable for 4-bit wireless data transport by a supporting signal processor system comprising:

a root sequence of 1332 prime numbers with a count distribution of 6 unique primes, wherein the root prime number distribution is 221 7s, 222 11s, 221 13s, 223 17s, 222 19s, and 223 23s, and wherein each prime number defines a unique pulse width in chipping rate bits, wherein the sum of all said 1332 prime numbers is 20000;

a random decimal number generator that provides random decimal numbers constrained to values of 0.0 to 1.0 upon request, wherein a unique random decimal number generator is defined for each of 6 sets of 200 sequences of 1332 unique random shuffle integers generated for use in shuffle operations;

a root, pilot, and data random shuffle file generator that uses said sequences of 1332 unique random shuffle integers, wherein said shuffle file generator provides a random number unique seed to said random number generator for every group of 200 sets of said sequences of 1332 random shuffle integers generated, wherein an accept-save or reject-discard decision is made based on a prior used flag value unique to the original index 1 to 1332 of the new shuffle integer selection, and wherein an accepted new shuffle integer index replaces said original integer index if index flag is "unused" and a "used" flag replaces said "unused" flag for said shuffle integer index, wherein each new shuffle integer index is a rounded product of said random decimal number and the decimal number 1332, and wherein the said rounded integer index is accepted only if it does not occur in any of the prior accepted rounded integers until there are 1332 accepted unique rounded integer that include the values of 1 to 1332, and wherein the new sequence of said accepted 1332 random integer sequence is saved to a file of 1332 new random shuffle integers with new index values, and wherein the file is labeled either 1332 odd random shuffle integers or 1332 even random shuffle integers, wherein said file name labels are formatted for 200 odd sets of 1332 random shuffle integers and for 200 even sets of 1332 random shuffle integers usable in the shuffle processes applied to the indices of said root, pilot and data tier0 1332 prime number sequences;

a root, pilot, and data pair of 1332 prime number shufflers, wherein an indexed prime number root sequence tandem shuffler selects 2 tandem shuffles out of one independent set of 100 defined sets of tandem 1332 shuffled prime numbers to create 2 unique sets of shuffled 1332 shuffled prime numbers, and wherein each said prime number indexed sequence tandem shuffler selects 2 unique outputs including tandem shuffler 50 output and tandem output 100 output, wherein the first unique set of 1332 prime numbers define and odd 1332 prime number sequence and the second unique set of 1332 prime numbers define and even 1332 prime number sequence, and wherein 4 unique 1332 prime number sequences are selected for use in the generation of 100 pairs of tier0 half-codes defining original data tier0 codes and for use in the generation of 100 pairs of tier0 half-codes defining original pilot tier0 codes, wherein a unique set of 100 shuffle 1332 integers from the said pilot and data are applied to the 4 unique 1332 prime number sequences resulting in 2 sets of 100 pairs of 1332 shuffled prime numbers that define the original odd and even tier0 half-codes labeled original data tier0 half-codes and original pilot tier0 half-codes, and wherein said sets of 100 tier0 half-codes are further shuffled using 200 data odd shuffle sets, 200 data even shuffle sets, 200 pilot odd shuffle sets and 200 pilot even shuffle sets, and wherein all combinations of shuffle unique pairs are used by the tier2 shufflers to define 40000 unique data shuffle pairs and 40000 pilot shuffle pairs, and wherein said 100 shuffled 1332 data primes and 100 shuffled 1332 pilot primes are uniquely paired to define 10000 unique pairs of said shuffled data primes and 10000 unique pairs of said shuffled pilot primes, and wherein the total possible pairs of 1332 data or pilot primes pairs is 10000×40000=400 million sets of 100 tier0 codes, and wherein said maximum data or pilot code count in this embodiment is 40 billion orthogonal non-repeating tier0 codes, wherein each set of 4 tier0 codes is usable in said tier0 code pair XOR operations to follow;

a random shuffle integers memory containing 6 unique 1332 random shuffle integers files generated by said root, pilot, and data random shuffle file generator, wherein each file contains 200 sets of unique 1332 shuffle sequences, wherein said shuffle file forms the complete shuffle integer file collection used by the said root, pilot and data tier0 code shufflers;

a tier0 code pairs XOR operation, wherein each said tier0 code is defined by 100 hex characters, and a pair of said tier0 codes form inputs to a tier0 code XOR operation, wherein the said tier0 XOR output is a single tier1 code that is define by 100 hex characters, and where the said tier0 code pairs include tier0 data code pairs and tier0 pilot code pairs;

a tier1 code pairs XOR operation, wherein each said tier1 code is defined by 100 hex characters, and a pair of said tier1 codes form inputs to a tier1 code XOR operation, wherein the said tier1 XOR output is a single CSK code that is define by 100 hex characters, and where the said tier1 code pairs include tier1 data code pairs and tier1 pilot code pairs;

a 10000 CSK codes save controller, wherein sets of 25 said CSK codes are collected from the output of said tier1 XOR operation until a total of 10000 said CSK codes is reached, wherein said 10000 CSK codes are saved to memory, wherein each file of said 10000 CSK codes is uniquely labeled to include channel number 1 to 20, and frame number 1 to 250, wherein each said frame file contains said 10000 CSK codes, and wherein said CSK codes are saved as 10000 lines of 100 hex characters defining each unique said CSK code, and wherein the file label is consistent with said CSK codes memory path structures for data or pilot said CSK codes usable by a supported signal processing system, wherein the total said CSK codes file count per channel is consistent with 250 frames equal to a 1-second epoch of non-repeating CSK codes, and wherein 20 channels of 1-second epoch of said CSK codes are saved to memory, wherein a time-synchronous retrieval of a CSK code file by a supported signal processing system implements the access to CSK codes to support data transport by a supported communications system;

a data and pilot CSK codes write and read memory, wherein the memory size is consistent with saved CSK codes to be time-synchronously retrieved for 20 channels and 250 frames of CSK codes with a binary chipping clock of 10 MHz, wherein a single said CSK code file containing 10000 CSK codes in hex-character format are retrievable from said data and pilot CSK codes write and read memory, and wherein the said CSK codes are 400 bit binary codes, and wherein said 10 MHz chipping rate is consistent with CSK code 40 microsecond transmit or receive time, and wherein a data channel is defined as including said 10000 CSK code files per frame and 250 frames per 1-second epoch;

a GPS-based event timer clock for providing synchronous time to said pilot CSK codes file selector and said data CSK codes file selector, wherein synchronous time is used by CSK symbol code extractors to synchronize data CSK symbol code extraction with receipt of transport data half-bytes and to synchronize pilot CSK codes file selector to local universal time controlled by the supported signal processing system;

a time-synchronous data CSK codes file selector for converting input signal processing system time of day for receive and time of day for transmit in a next 40 microsecond transmit slot, wherein the time of day is converted to a data CSK pathway to the synchronous data 10000 CSK codes file in memory, and wherein each pathway for the said receive time of day and for the said transmit time of day is sent as a request to the said data CSK codes write read memory, wherein the said data CSK codes write read memory outputs said data 10000 CSK codes receive file and said data 10000 CSK codes transmit file, wherein each file includes 1 frame of CSK codes that are synchronously transferred directly to the supported signal processing system;

a time-synchronous pilot CSK codes file selector for converting signal processing system time of day for receive and time of day for transmit in a next 40 microsecond transmit slot, wherein the time of day is converted to a pilot CSK pathway to the synchronous pilot 10000 CSK code file in memory, and wherein each pathway for the said receive time of day and for the said transmit time of day frame is sent as a request to the said data and pilot CSK codes write read memory, and wherein the said data and pilot CSK codes write read memory outputs said pilot 10000 CSK codes file for synchronous demodulation acquisition and tracking, and wherein a transmit file containing said pilot 10000 CSK codes is locked to GPS-based event timer clock reference provides local universal time to synchronous said pilot transmit CSK codes file selector, wherein said transmit pilot CSK codes files are transferred directly to the applicable modulator of a supported signal processing system;

a time-synchronous CSK symbol code extractor means that provides CSK symbol code extraction of 1 to 16 CSK symbol codes from each original said CSK code received by said data CSK file selector output that is provided to the supported signal processing system, wherein 16 unique and orthogonal said CSK symbol codes are extractable from each unique said CSK code received by said CSK file selector from memory, wherein a channel frame of 10000 said CSK codes per file are retrieved from said CSK codes write and read memory, and wherein each single data or pilot CSK code is used as a source of said 16 data CSK symbol codes, wherein each data CSK symbol code transmission represents 4 bits of transport data, and wherein each said pilot CSK symbol code represents a selected pilot code usable for synchronization to time of time-of-day parameters of the communications system, and wherein the said symbol code extraction process for transmit or receive consists of the selection of a 100 hex character symbol code from a self-concatenated received CSK code from memory processed by the supported signal processing system, and wherein the said self-concatenated CSK code contains 200 hex characters, wherein said 200 hex character file record contains 16 CSK symbol code start points for each of 16 sets of 100 hex characters, wherein each of said 16 unique symbol codes start points is separated from a neighbor symbol code start point by 6 hex characters, and wherein the said symbol code is defined by the supported signal processing system as 100 hex characters beginning at the said selected start point defined by the symbol code index 0 to 15 equivalent to the applicable set of data transport 4-bits provided to the supported signal processing system, wherein the said symbol index is equivalent to said 4-bit half-byte time-synchronously provided to the supported signal processing system, wherein the said half-byte of data is used as the index of the CSK symbol code to be extracted from the known CSK code, wherein the said CSK symbol code is extracted by modulators or demodulators under control of the supported signal processing system.

* * * * *